United States Patent
Kasahara et al.

(10) Patent No.: US 7,810,605 B2
(45) Date of Patent: Oct. 12, 2010

(54) VEHICLE STEERING DEVICE AND CONTROL METHOD FOR VEHICLE STEERING DEVICE

(75) Inventors: Toshiaki Kasahara, Kanagawa (JP); Yuusuke Katou, Kawasaki (JP); Junji Tsutsumi, Fujisawa (JP); Kenichi Mori, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 489 days.

(21) Appl. No.: 11/951,442

(22) Filed: Dec. 6, 2007

(65) Prior Publication Data
US 2008/0156572 A1 Jul. 3, 2008

(30) Foreign Application Priority Data

| Dec. 28, 2006 | (JP) | ............................ 2006-353900 |
| Feb. 23, 2007 | (JP) | ............................ 2007-043042 |
| Oct. 18, 2007 | (JP) | ............................ 2007-270829 |

(51) Int. Cl.
B62D 5/00 (2006.01)
(52) U.S. Cl. ..................... 180/402; 180/403
(58) Field of Classification Search ................ 180/402, 180/403, 405, 406, 407
See application file for complete search history.

(56) References Cited

U.S. PATENT DOCUMENTS

| 5,915,514 | A | 6/1999 | Nojiri et al. | |
| 6,244,403 | B1 | 6/2001 | Ito et al. | |
| 6,442,462 | B1 * | 8/2002 | Nishizaki et al. | ............... 701/41 |
| 6,612,395 | B2 * | 9/2003 | Moser et al. | ................ 180/446 |
| 6,938,721 | B2 * | 9/2005 | Ono et al. | ................... 180/402 |
| 7,007,769 | B2 * | 3/2006 | Hara et al. | ................... 180/402 |
| 7,448,464 | B2 * | 11/2008 | Yamasaki et al. | ........... 180/402 |
| 7,568,549 | B2 * | 8/2009 | Wun et al. | ................... 180/402 |
| 7,690,475 | B2 * | 4/2010 | Tsutsumi et al. | ............ 180/402 |
| 7,708,108 | B2 * | 5/2010 | Miyasaka et al. | ........... 180/402 |
| 7,726,437 | B2 * | 6/2010 | Kasahara | ..................... 180/405 |
| 2005/0082108 | A1 * | 4/2005 | Husain | ........................ 180/402 |
| 2006/0042859 | A1 * | 3/2006 | Itoh | ............................. 180/402 |
| 2006/0129294 | A1 * | 6/2006 | Moser et al. | ................... 701/41 |
| 2006/0289227 | A1 * | 12/2006 | Chino et al. | ................. 180/402 |
| 2007/0151795 | A1 * | 7/2007 | Chino et al. | ................. 180/444 |

(Continued)

FOREIGN PATENT DOCUMENTS

EP 1 607 303 A2 12/2005

(Continued)

*Primary Examiner*—Lesley Morris
*Assistant Examiner*—Marc A Scharich
(74) *Attorney, Agent, or Firm*—Young Basile

(57) ABSTRACT

A vehicle steering device and method for preventing steering wheel pull. A selectively engageable clutch is positioned between a steering wheel and a turning mechanism for turning at least one steered wheel. The clutch includes an engaging piece and has an engaged position where the steering wheel is mechanically connected to the turning mechanism and a disengaged position where the steering wheel is mechanically separated from the turning mechanism and steer-by-wire controls the at least one steered wheel. When the clutch is moved from the engaged position to the disengaged position, clutch release control is performed that provides a rotational angle of deviation between a steering wheel shaft connected to the steering wheel and the turning mechanism, the rotational angle of deviation provided in the direction of disengagement.

20 Claims, 20 Drawing Sheets

U.S. PATENT DOCUMENTS

| | | | |
|---|---|---|---|
| 2007/0221434 A1* | 9/2007 | Chino et al. | 180/402 |
| 2008/0185213 A1* | 8/2008 | Mori et al. | 180/402 |
| 2009/0101429 A1* | 4/2009 | Williams | 180/402 |

FOREIGN PATENT DOCUMENTS

| | | |
|---|---|---|
| EP | 1 726 511 A2 | 11/2006 |
| JP | 2005-008073 | 1/2005 |
| JP | 2005-262969 | 9/2005 |
| JP | 2006-001417 | 1/2006 |

* cited by examiner

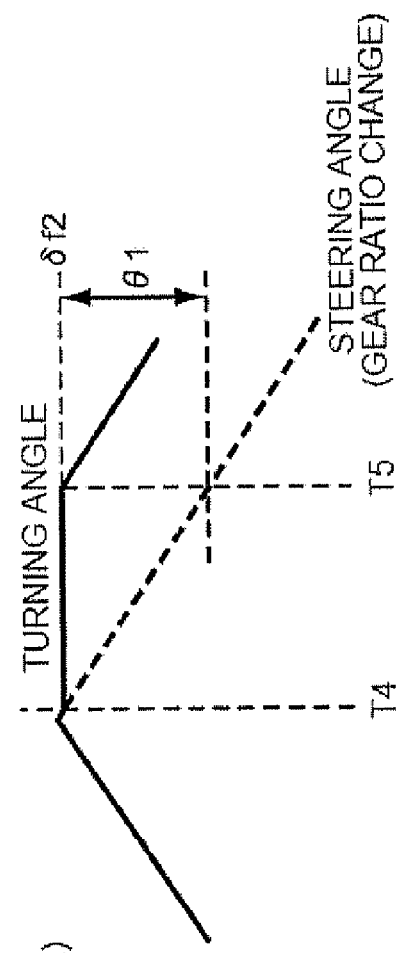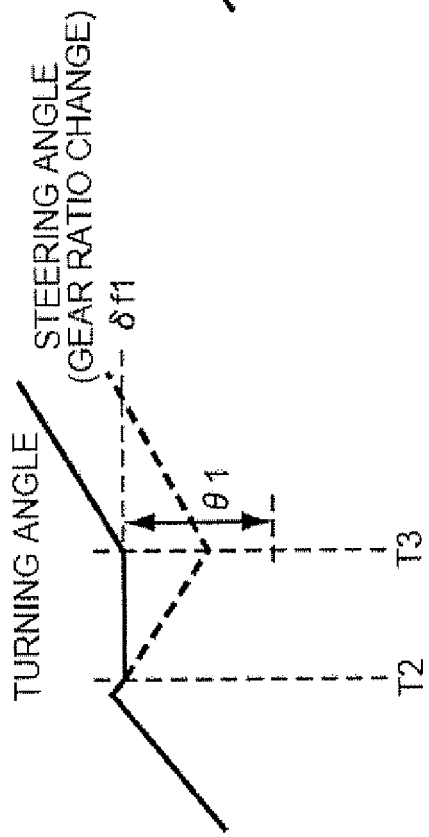

VEHICLE STEERING DEVICE AND CONTROL METHOD FOR VEHICLE STEERING DEVICE

CROSS-REFERENCE TO RELATED APPLICATIONS

This application claims priority from Japanese Patent Application Serial Nos. 2006-353900, filed Dec. 28, 2006, and 2007-043042, filed Feb. 23, 2007, and 2007-270829, filed Oct. 18, 2007, each of which is incorporated herein in its entirety by reference.

TECHNICAL FIELD

The invention pertains to the field of vehicle steering devices, and more particularly, the invention pertains to a steer-by-wire vehicle steering device having a clutch operable to selectively couple a vehicle wheel turning mechanism and a steering wheel.

BACKGROUND

Steer-by-wire steering systems are known. Generally stated, steer-by-wire steering systems are steering devices wherein the steering wheel is not mechanically connected to the steered wheels of the vehicle. Instead, steer by-wire steering systems allow remote operation of a motorized turning mechanism according to the angle of rotation, or steering angle, of a steering wheel. Furthermore, there are known steer-by-wire steering systems that allow for direct mechanical control of the turning mechanism in the event of electrical system problems. For example, in Japanese Kokai Patent Publication Nos. 2005-262969 and 2005-008073, steer-by-wire steering systems are shown that have a clutch that couples the rotating shaft of the vehicle wheel turning mechanism and the rotating shaft of the steering wheel, and thus, direct mechanical control of the turning mechanism using the steering wheel is made possible. As another example, Japanese Kokai Patent Publication No. 2006-001417 shows a vehicle steering device that shifts from steer-by-wire control to direct mechanical steering control by mechanically coupling the steering wheel and the turning mechanism when the turning angle approaches a maximum value.

BRIEF SUMMARY

In one vehicle steering device taught herein, the device includes a steering wheel operable by a driver and having a steering wheel shaft connected thereto, a turning mechanism operable to turn at least one steered wheel to a turning angle in response to operation of the steering wheel, and a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel. A steering control part is configured to control the turning mechanism and selectively move the clutch between the engaged position and the disengaged position in response to the steering wheel. On moving the clutch from the engaged position to the disengaged position, the steering control part is configured to perform clutch release control by providing a rotational angle of deviation between the steering wheel shaft and the turning mechanism in a direction of disengagement.

Vehicle steering controllers and control methods for a vehicle are also taught herein. The vehicle can include a steering wheel operable by a driver and having a steering wheel shaft connected thereto, a turning mechanism operable to turn at least one steered wheel to a turning angle in response to operation of the steering wheel, and a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member. The clutch has an engaged position when the engaging piece is in wedging engagement between the first rotary member and the second rotary member wherein the steering wheel shaft is mechanically connected to the turning mechanism for turning the at least one steered wheel, and the clutch has a disengaged position when the engaging piece is in intermediate position between the first rotary member and the second rotary member wherein the steering wheel shaft is mechanically separated from the turning mechanism for steer-by-wire control of the at least one steered wheel. One controller taught herein includes means for selectively moving the selectively engageable clutch between the engaged position and the disengaged position in response to operation of the steering wheel and means for performing clutch release control by providing a rotational angle of deviation between the steering wheel shaft and the turning mechanism in a direction of disengagement when moving the clutch means from the engaged position to the disengaged position.

In a vehicle such as that described above, a control method taught herein includes, by example, selectively moving the clutch between the engaged position and the disengaged position in response to the steering wheel and performing clutch release control by providing a rotational angle of deviation between the steering wheel shaft and the turning mechanism in a direction of disengagement when moving the clutch from the engaged position to the disengaged position.

BRIEF DESCRIPTION OF THE DRAWINGS

The description herein makes reference to the accompanying drawings wherein like reference numerals refer to like parts throughout the several views, and wherein:

FIG. 11A is a detail view showing area B of FIG. 10;

FIG. 11B is a detail view showing area C of FIG. 10;

DETAILED DESCRIPTION OF EMBODIMENTS OF THE INVENTION

In known steer-by-wire steering systems, a clutch is used that mechanically connects the steering wheel to the vehicle wheel turning mechanism by engaging the rotating shaft of the vehicle wheel turning mechanism to the rotating shaft of the steering wheel by means of an engaging piece. For this reason, when returning again to steer-by-wire control after shifting from steer-by-wire control to power steering control, there is the possibility of the clutch remaining engaged even after clutch a release instruction is output. When there is a shift to steer-by-wire control while the steering wheel remains mechanically connected to the turning mechanism, there is the risk of so-called steering wheel pull in which torque contrary to the driver's expectations occurs in the steering wheel.

Exemplary embodiments of the invention described in detail hereinafter with reference to the drawings minimize this risk.

Figure 1:
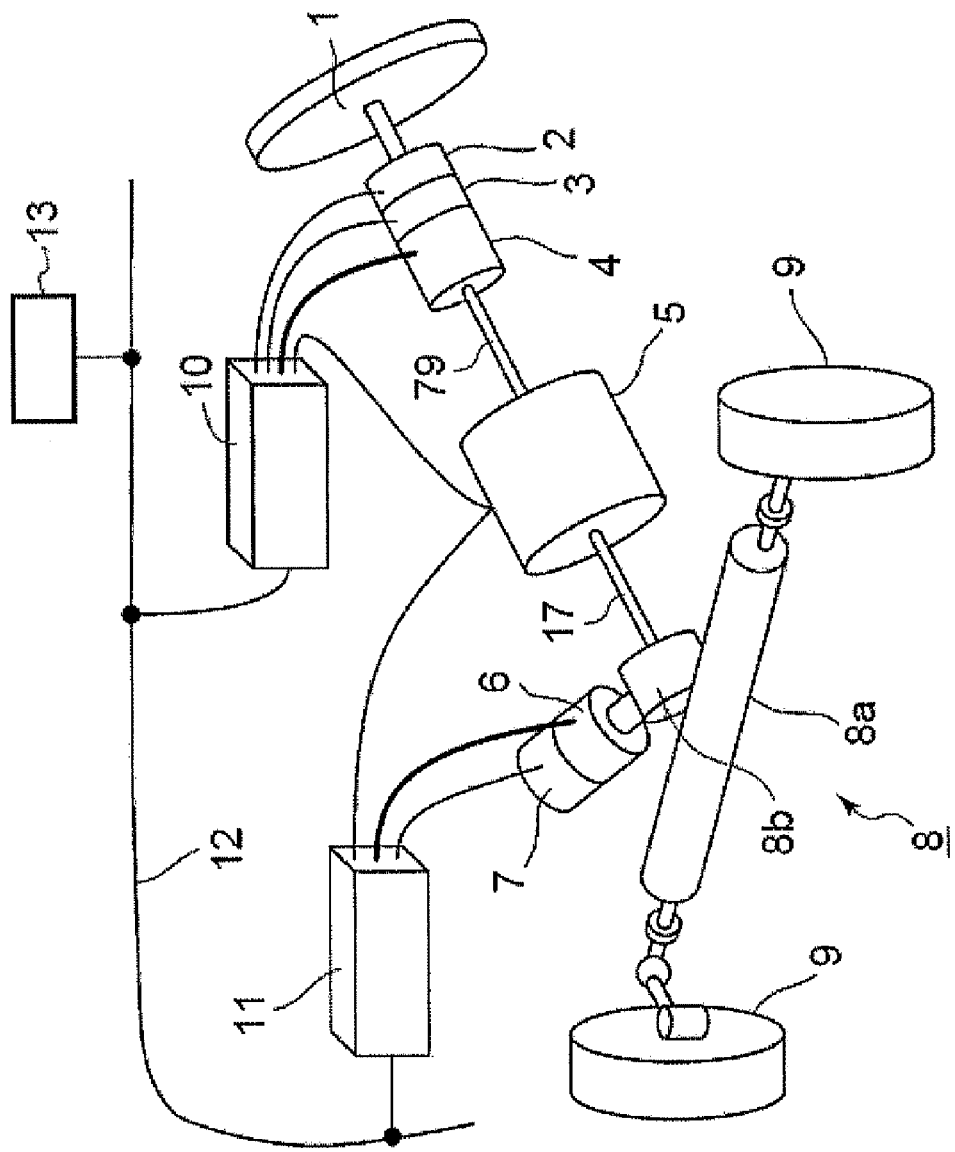
FIG. 1 is an overall perspective view of a steer-by-wire system incorporating a vehicle steering device according to embodiments of the invention.

As shown in FIG. 1, a vehicle steering device according to certain embodiments of the invention has a steering wheel 1 that can be operated (steered) by the driver and a steering wheel shaft 79, which is the rotating shaft of the steering wheel 1 and is connected to the steering wheel 1. A steering angle sensor 2 senses the steering angle of the steering wheel 1, and a torque sensor 3 senses the steering torque of the steering wheel 1. A steering reaction motor 4 provides a reaction force to the steering wheel 1. The vehicle steering device also includes a clutch 5 and left and right front wheels 9, which are the steered wheels of the vehicle. A vehicle wheel turning mechanism 8 has a rack 8a that is connected to the left and right front wheels 9, a pinion 8b that is connected to the rack 8a by a gear mechanism and a pinion shaft 17 (that is, a vehicle wheel turning rotating shaft) is mounted to the pinion 8b for rotation therewith. A vehicle wheel turning motor 6 is connected to the pinion shaft 17 by a gear mechanism. Therefore, the vehicle wheel turning motor 6 is operable to steer the left and right front wheels 9 by driving the vehicle wheel turning mechanism 8. A turning angle sensor 7 senses the angle of rotation, or turning angle, of the vehicle wheel turning motor 6. Also included are a steering controller 10, a turning controller 11 and a communication line 12 that electrically connects the steering controller 10 to the turning controller 11 for electrical communication therewith.

Figure 3:
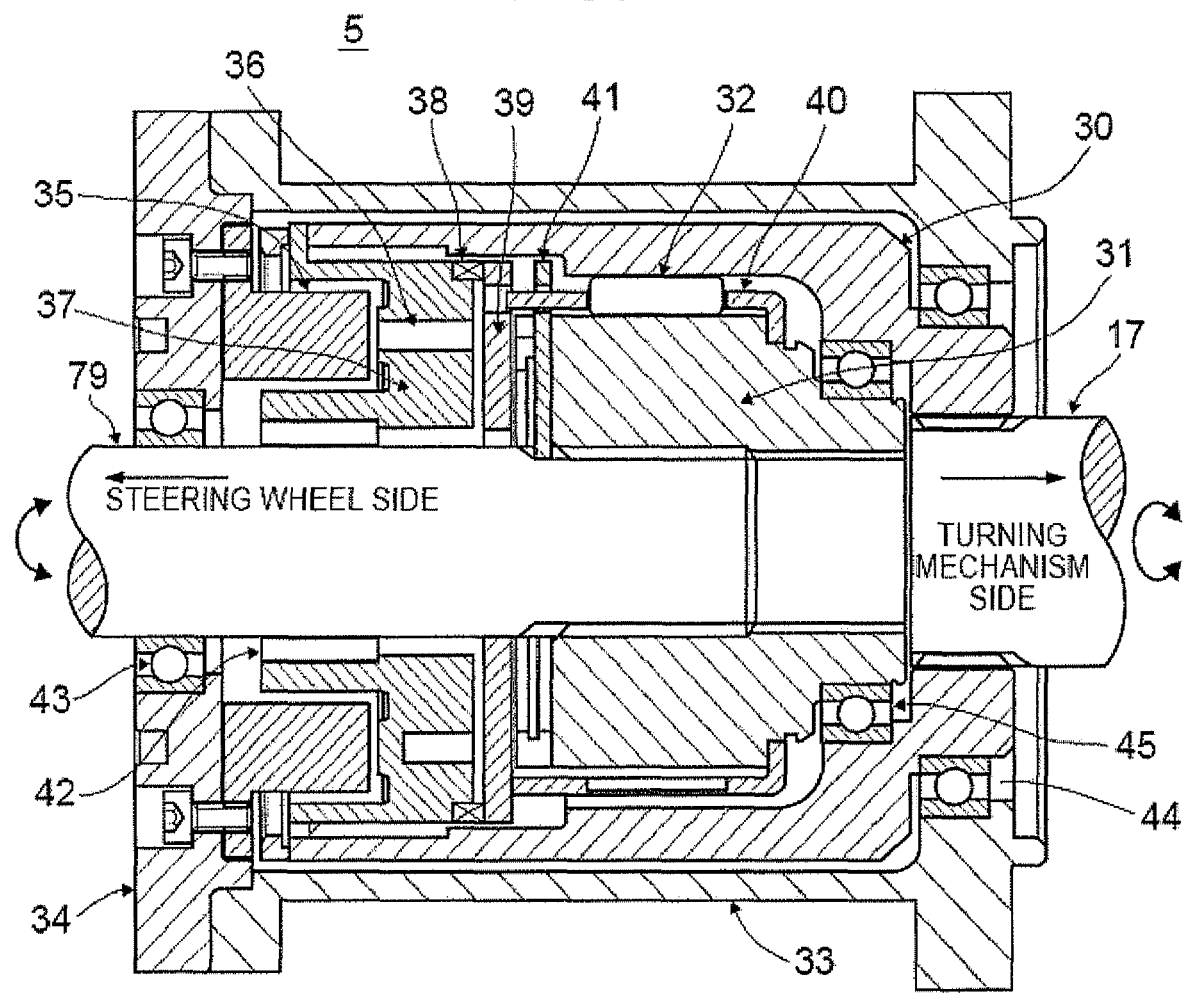
FIG. 3 is a cross-sectional view of a clutch in the vehicle steering device according to the first embodiment.

The steering wheel 1 and the vehicle wheel turning mechanism 8 are mechanically coupled or separated by the engagement or release, respectively, of the clutch 5. The clutch 5 mechanically couples steering wheel 1 and vehicle wheel turning mechanism 8 by engaging the steering wheel shaft 79 of the steering wheel 1 and the pinion shaft 17 of the vehicle wheel turning mechanism 8 by means of an engaging piece, or roller 32, as shown in FIG. 3.

The reaction motor 4 imparts a steering reaction force to the steering wheel 1, and the vehicle wheel turning motor 7 drives the vehicle wheel turning mechanism 8 to steer and drive the front wheels 9.

A steer-by-wire system according to the first embodiment normally operates without a mechanical connection between the steering wheel 1 and the vehicle wheel turning mechanism 8. However, a clutch 5 is operable to selectively couple and separate the steering wheel shaft 79 and the pinion shaft 17. Accordingly, the steering wheel shaft 79 and the pinion shaft 17 are coupled by engaging the clutch 5, and thus, the steering wheel 1 and the vehicle wheel turning mechanism 8 can be mechanically coupled.

Rotation of the steering wheel 1 is sensed by the steering angle sensor 2, and an instructed turning angle is calculated by the steering controller 10. The instructed turning angle is an instructed value by means of which a target turning angle is converted to the angle of rotation of the vehicle wheel turning motor 6. The turning controller 11 calculates a turning drive instruction value for the vehicle wheel turning motor 6 so that the actual turning angle (that is, an angle of rotation) of the vehicle wheel turning motor 6 sensed by the steering wheel angle sensor 7 matches the instructed turning angle. The turning drive instruction value calculated by the turning controller 11 is output as an electrical current instruction value to the vehicle wheel turning motor 6. The front wheels 9 are turned by the vehicle wheel turning motor 6 of the vehicle wheel turning mechanism 8 according to the turning drive instruction value. The vehicle wheel turning motor 6 may be a brushless motor or the like.

Figure 2:
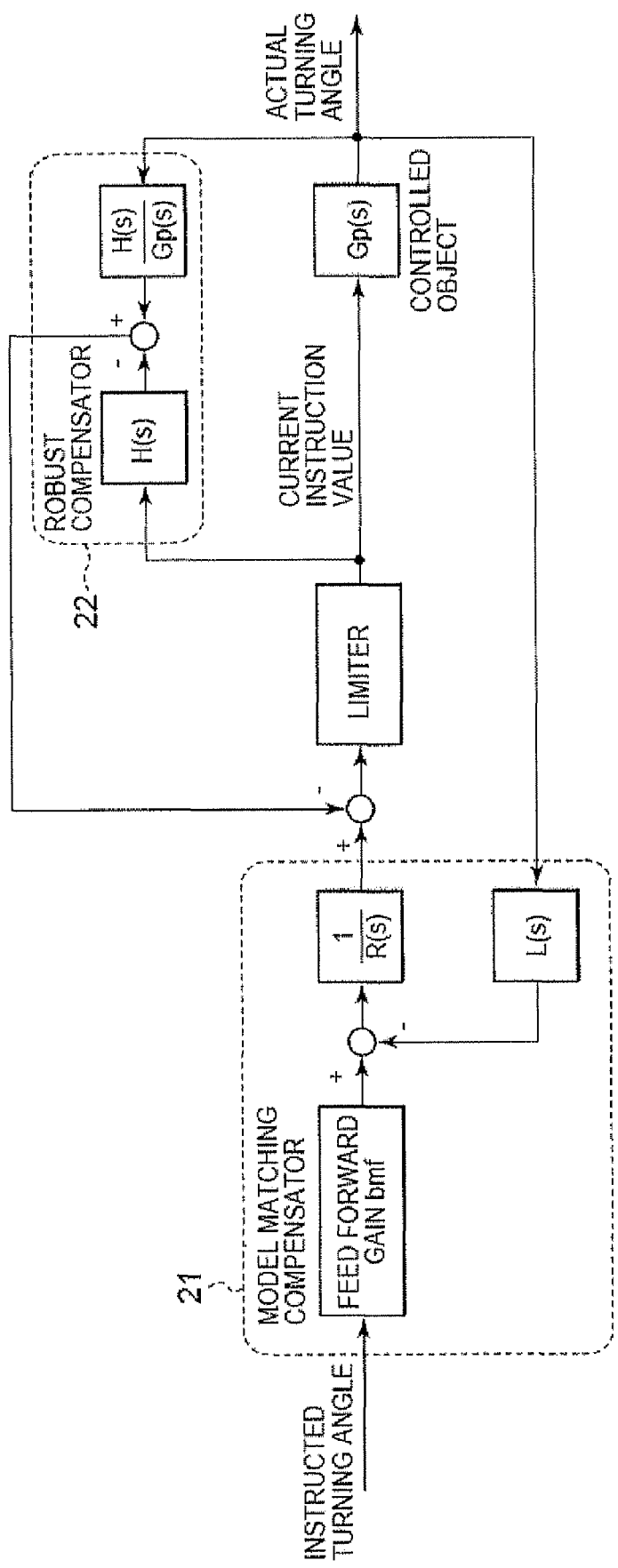
FIG. 2 is a block diagram of a turning angle control system according to a first embodiment of the invention.

The turning drive instruction value calculated by the turning controller 11 is calculated with a turning angle control system such that the actual turning angle will track the instructed turning angle with prescribed response characteristics. The turning angle control system operates according to a robust model matching technique, as shown in FIG. 2 for example. With this method, the turning drive instruction value is calculated using a model matching compensator 21, and a compensated electrical current that compensates for external disturbance components is calculated using a robust compensator 22. Thus, the turning angle control system is able to resist external disturbances so that the actual turning angle can exhibit standard response characteristics even when external disturbances occur.

The reaction motor 4 provides a reaction force to the steering wheel 1 corresponding to the forces acting upon the front wheels 9. For example, a reaction motor drive instruction value is calculated by the steering controller 10 based on the reaction force sensed by an axial force sensor (not shown) disposed within the hubs of the front wheels 9 for sensing the tire lateral force acting upon the front wheels 9. The reaction motor drive instruction value calculated by the steering controller 10 is output as an electrical current instruction value to the reaction motor 4. The reaction motor 4 is then driven according to the reaction motor drive instruction value. The reaction motor 4 may be a brushless motor or the like.

Each of the controllers 10 and 11 is, for example, a microcomputer including a random access memory (RAM), a read-only memory (ROM) and a central processing unit (CPU) in addition to various input and output connections. Generally, the control functions described herein and associated with each of the controllers are performed by execution by the CPU of one or more software programs stored in ROM. Of course, some or all of the illustrated components of the controllers and their associated functions can be implemented by hardware components. While two controllers 10 and 11 are shown, only one or more than two are also possible.

In the vehicle steering device according to the first embodiment, the clutch 5 is normally released, and steer-by-wire control is performed to drive the vehicle wheel turning mechanism 8 according to the steering angle of the steering wheel 1. However, when the turning angle of the front wheels 9 nears a maximum turning angle, the clutch 5 is engaged, thereby mechanically connecting the steering wheel 1 to the turning mechanism 8, and electronic power steering (EPS) is performed to turn the front wheels 9 using both the motor 6 as well as the force applied to the steering wheel 1 by the driver. The clutch 5 is subsequently released when the driver turns the steering wheel back and steer-by-wire control is reestablished.

Although the clutch 5 is described as engaging when the turning angle of front wheels 9 near the maximum turning angle, it should be understood that the clutch 5 could be engaged in other situations, for example, when there is a fault in the steer-by-wire electrical system, or when any other abnormality occurs.

As shown in FIG. 3, the clutch 5 is a two-way clutch that has a first rotary member, namely an outer ring 30, a second rotary member, namely an inner ring 31, a magnetizing part that generates magnetic force for clutch separation and connection, and a mechanical clutch part that is operated by the magnetizing part to separate or connect the outer ring 30 and the inner ring 31. A rotary member provided with a mechanical clutch part is connected either to steering wheel shaft 79 coupled to the steering wheel 1 or to the pinion shaft 17 of the vehicle wheel turning mechanism 8, whichever has the smaller change in angle of rotation.

The inner ring 31 of the clutch 5 is connected to the steering wheel shaft 79, and the outer ring 30 of the clutch 5 is connected to the pinion shaft 17. In particular, the steering wheel shaft 79 and the inner ring 31 of the clutch 5 engage one another via complementarily engaging serrations. Likewise, the pinion shaft 17 and the outer ring 30 of the clutch 5 engage one another via complementarily engaging serrations.

Figure 4:
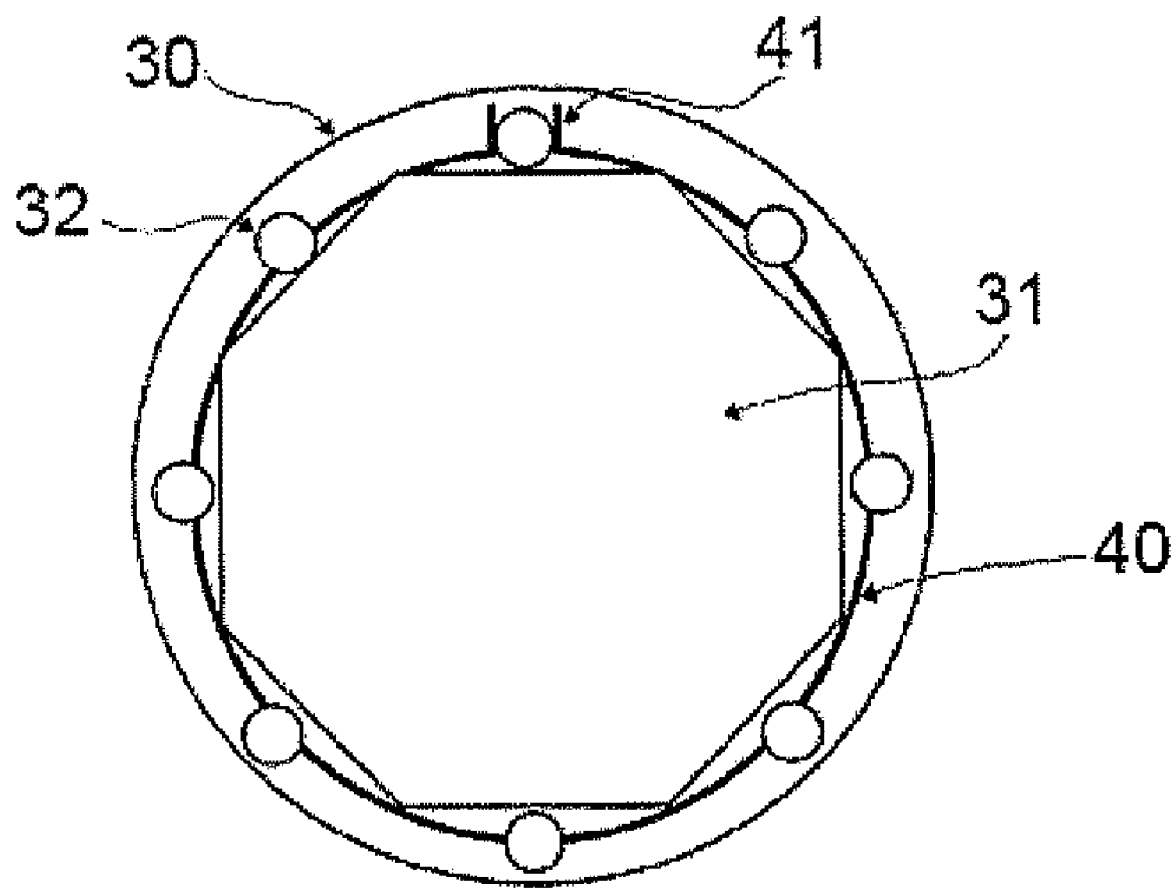
FIG. 4 is an illustration showing the mechanical clutch part of the clutch according to FIG. 3.

As shown in FIG. 4, the outer ring 30 has a substantially tubular inner circumferential surface. The inner ring 31 is seated within the outer ring 30 and has an octagonal shape defined on the inner circumferential surface thereof. The clutch 5 further includes a plurality of rollers 32 (as engaging pieces) that are interposed between the outer ring 30 and the inner ring 31.

The clutch 5 moves between the released state, wherein the steering wheel shaft 79 is not mechanically coupled to the pinion shaft 17, and an engaged state, wherein the steering wheel shaft 79 is mechanically coupled to the pinion shaft 17. In the released state of the clutch 5, the rollers 32 are held in an intermediate position with respect to the inner ring 31 by the magnetizing part, thereby allowing the outer ring 30 to rotate freely with respect to the inner ring 31. In the engaged state of the clutch 5, the rollers 32 are not held in the intermediate position by the magnetizing part, and the rollers 32 become wedged between the outer ring 30 and the inner ring 31, thus causing the outer ring 30 and the inner ring 31 to rotate in unison with one another.

The magnetizing part, as shown in FIG. 3, includes an electromagnetic coil 35 that is affixed to an end plate 34 (also called a clutch case member) of a clutch case 33, a rotor 37 that engages the outer ring outer ring 30 via serrations, and a permanent magnet 36 arranged inside the field of the electromagnetic coil 35. Here, since the permanent magnet 36 is arranged inside the field of electromagnetic coil 35, the electromagnetic coil 35 is operable to impart magnetic flux of the same or opposite phase to the magnetic flux generated by the permanent magnet 36.

As best seen in FIG. 3, the clutch 5 includes an armature 39 arranged to be movable axially via a separating spring 38 relative to the rotor 37. The plurality of rollers 32, which serve as multiple engaging pieces interposed between the outer ring 30 and the inner ring 31, are fitted into pockets of a holder 40 to maintain the established equidistant spacing of the plurality of rollers 32. Here, the holder 40 is supported for movement in the direction of rotation relative to the inner ring 31.

As best seen in FIG. 4, a centering spring 41 is provided to hold a roller of the plurality of rollers 32 in the intermediate position when the clutch is released. During the transition from clutch engagement to release, the centering spring 41 imparts a spring force onto the rollers 32 to return them to the intermediate position as the rollers 32 are in wedging engagement between the outer ring 30 and the inner ring 31 during engagement of the clutch 5. Here, centering spring 41 is fixed to inner ring 31.

The clutch 5 also includes a needle bearing 42 furnished between the steering wheel shaft 79 and the rotor 37. Furthermore, the clutch 5 includes a first ball bearing 43 that supports the steering wheel shaft 79 at the end plate 34. A second ball bearing 44 supports the outer ring 30 at the clutch case 33. A third ball bearing 45 is interposed between the outer ring 30 and the inner ring 31.

The steering processing operation executed by the steering controller 10 according to the first embodiment is now explained with reference to the flow chart shown in FIG. 5. Control processing is executed in individual control operation cycles (5 msec, for example).

At step S1 it is determined whether the absolute value of the turning angle is at or above a prescribed value $\delta$ f1. When the absolute value of the turning angle is at or above the prescribed value $\delta$ f1, step S1 evaluates as "YES," and the process proceeds to step S2. When the absolute value of the turning angle is below the prescribed value $\delta$ f1, step S1 evaluates as "NO," and the process proceeds to step S5.

The prescribed value δ f1 is, for example, the maximum angle of the turning angle, which is dictated mechanically by the maximum travel (rack end) of the pinion 8b on the rack 8a of the vehicle wheel turning mechanism 8. The value of the actual turning angle is determined using the steering wheel angle sensor 7, which is read by the turning controller 11 and is then transmitted to the steering controller 10 over the communication line 12.

At step S2 an engage instruction is output to the clutch 5 as a preparation for transfer to EPS control, and the process continues to step S3, where preparation for transfer to EPS control continues. Namely, where the reaction force torque output from the reaction motor 4 is turned off (set to 0), and the instructed electrical current value is calculated based on the value from the torque sensor 3 so that the output torque of the vehicle wheel turning motor 6 will be the supplemental steering force (a steering assist force) that is added to the steering force supplied by the driver. The process then proceeds to step S4.

At step S4 EPS control is executed. Process flow then goes to RETURN. With EPS control, the instructed electrical current value for vehicle wheel turning motor 6 is calculated based on the value from torque sensor 3, which is passed to the turning controller 11 by electrical communications. In this manner, EPS operation is realized.

At step S5 it is determined whether EPS control is in progress. When EPS control is in progress, step S5 evaluates as "YES," and the process proceeds to step S6. When EPS control is not in progress, step S5 evaluates as "NO," and flow goes to RETURN.

At step S6 it is determined whether the absolute value of the turning angle is less than a prescribed value δ f2. When the absolute value of the turning angle is less than the prescribed value δ f2, step S6 evaluates as "YES," and the process proceeds to step S7. When the absolute value of the turning angle is at or above the prescribed value δ f2, step S6 evaluates as "NO," and the process goes to RETURN. Here, δ f2 is a value smaller than δ f1 (δ f1–1°, for example).

At step S7 the steering reaction force is applied by reaction motor 4, processing is performed to increase the vehicle wheel turning torque generated by the vehicle wheel turning motor 6 by the amount of reaction force applied, and flow goes to step S8. In short, control is performed to increase the torque generated by the vehicle wheel turning motor 6 in the opposite direction at a magnitude equal to the steering reaction force generated by the reaction motor 4 and to cancel the steering reaction force by means of the torque increase by the vehicle wheel turning motor 6, whereupon flow goes to step S8.

At step S8 it is determined whether the absolute value of the turning angle is less than a prescribed value δ f3. When the absolute value of the turning angle is less than the prescribed value δ f3, step S8 evaluates as "YES," and the process proceeds to step S9. When the absolute value of the turning angle is at or above the prescribed value δ f3, step S8 evaluates as "NO," and the process goes to RETURN. Here, δ f3 is a value smaller than δ f2 (δ f2–2°, for example).

At step S9 it is determined whether the steering operation is turning the steering wheel 1 back toward a neutral (straight) position of the front wheels 9. Whether the steering operation is turning the steering wheel 1 back can be determined using the steering angle sensor 2 to determine whether the absolute value of the steering angle is changing continually in a decreasing direction. If the steering operation is turning the steering wheel 1 back, step S9 evaluates as "YES," and the process proceeds to step S10. When the steering operation is not turning the steering wheel 1 back, step S9 evaluates as "NO," and the process proceeds to step S2. In short, when steering with further turning is in progress, it is determined that torque is acting on the clutch 5 in the direction of engagement, and flow goes to step S2. When steering by turning back is in progress, it is determined that torque is acting on the clutch 5 in the direction of disengagement, and flow goes to step S10.

At step S10 an instructed turning angle is issued to hold the turning angle at the prescribed value δ f3 (or when the steering wheel angle is negative, –δ f3), and the process proceeds to step S11.

At step S11 a clutch release instruction is output to the clutch 5, and the process proceeds to step S12.

At step S12 it is determined whether the angle of deviation between the steering angle and the turning angle is at or above a prescribed value θ1. When the angle of deviation between the steering angle and the turning angle is at or above a prescribed value θ1, step S12 evaluates as "YES," and the process proceeds to step S13. When the angle of deviation between the steering angle and the turning angle is not at or above the prescribed value θ1, step S12 evaluates as "NO," and flow goes to RETURN. The value θ1 is a predetermined value based on the difference between the intermediate position and the engaged position for rollers 32.

Also at step S12, the determination is made based on the angle of deviation between a variable gear ratio converted steering angle (steering angle×1.2, when the ratio of the turning angle to the steering angle is 1.2) and the turning angle when variable gear control is performed.

At step S13 steer-by-wire control is executed, and flow goes to RETURN.

Figure 6:
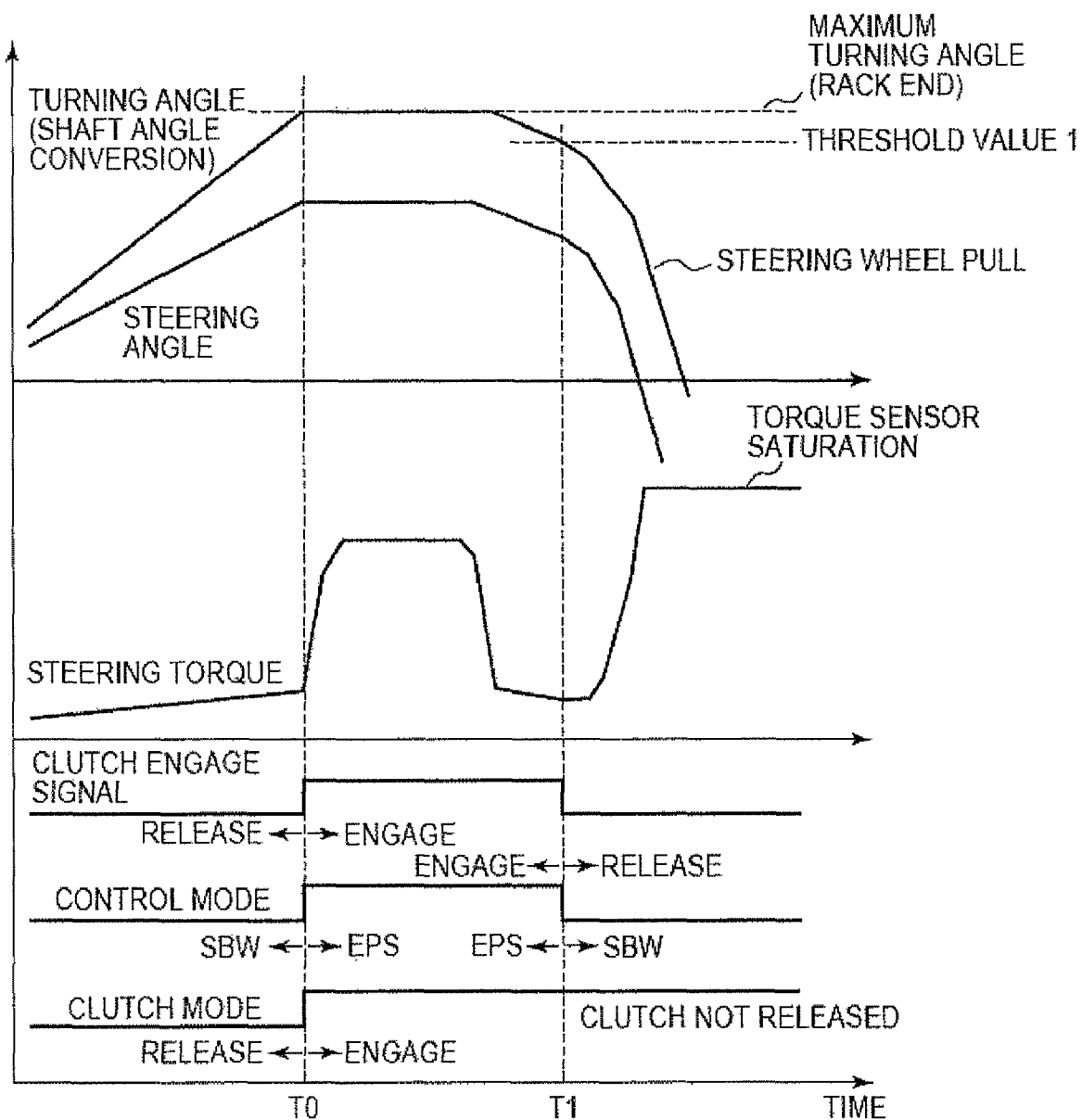
FIG. 6 is a timing chart showing operating characteristics of known steer-by-wire-systems.

In known steer-by-wire systems, when control is returned to steer-by-wire control after EPS control, the clutch that connects the steering wheel to the turning mechanism may remain engaged even after a clutch release instruction is output. Steer-by-wire control is commenced. In this case, when a two-way clutch such as that shown in FIGS. 3 and 4 is used there is a risk of steering wheel pull occurring wherein torque contrary to that expected by the driver is exerted upon the steering wheel by the turning mechanism. An example of this phenomenon is shown in FIG. 6, which is a timing chart that explains the factors involved in the generation of steering wheel pull, and shows a case in which variable gear control is performed such that the turning angle is larger than the steering angle.

At time point T0, when the maximum turning angle that is physically possible (such as at the rack end) is reached, a clutch engage signal is output to engage the clutch, and the system goes from steer-by-wire control to EPS control. In this way, even if the driver tries to turn the steering wheel further, the mechanical coupling of the front wheels to the steering wheel allows a large steering reaction force to be generated without the steering angle changing, and thus the driver is made aware of having reached the rack end.

When the turning angle reaches threshold value 1 (less than the maximum turning angle) at time point T1 because the driver is turning the steering wheel back, the system returns from EPS control to steer-by-wire control. In this case, if the clutch remains engaged and is not released, coupling of the front wheels to the steering wheel is maintained. The change in the turning angle becomes the same as the change in the steering angle, and a torque contrary to that expected by the driver is generated in the steering wheel, creating steering wheel pull.

In operation of the vehicle steering device according to the first embodiment, when a clutch release instruction is output, the turning angle of the front wheels 9 is controlled so that the change in turning angle of the front wheels 9 will be smaller than the change in the steering angle.

In short, the clutch 5 is engaged near the maximum turning angle in order to transition from steer-by-wire control to EPS control. When the clutch 5 is released to return to steer-by-wire control from EPS control when steering back, flow advances through the steps S11 step S5→step S6→step S7→step S8→step S9→step S10 in the flow chart of FIG. 5. After the turning angle is held at the prescribed value δ f3 at step S10, a clutch release signal is output at step S11. When the angle of deviation between the steering angle and the turning angle is determined to be at or greater than prescribed value θ1 at step S12, flow advances to step S13, and steer-by-wire control is executed.

In this way, the torque acting in the direction of engagement of clutch 5 can be reduced and the clutch 5 that is engaged can be reliably released when shifting from EPS control to steer-by-wire control, thus preventing steering wheel pull, which is caused when the clutch 5 cannot be released.

The result is that processing to go from EPS control to steer-by-wire control can be performed to reliably disengage the clutch 5 in a steer-by-wire system that uses a two-way clutch, such as the clutch 5, that mechanically couples the turning mechanism 8 to the steering wheel 1.

Figure 5:
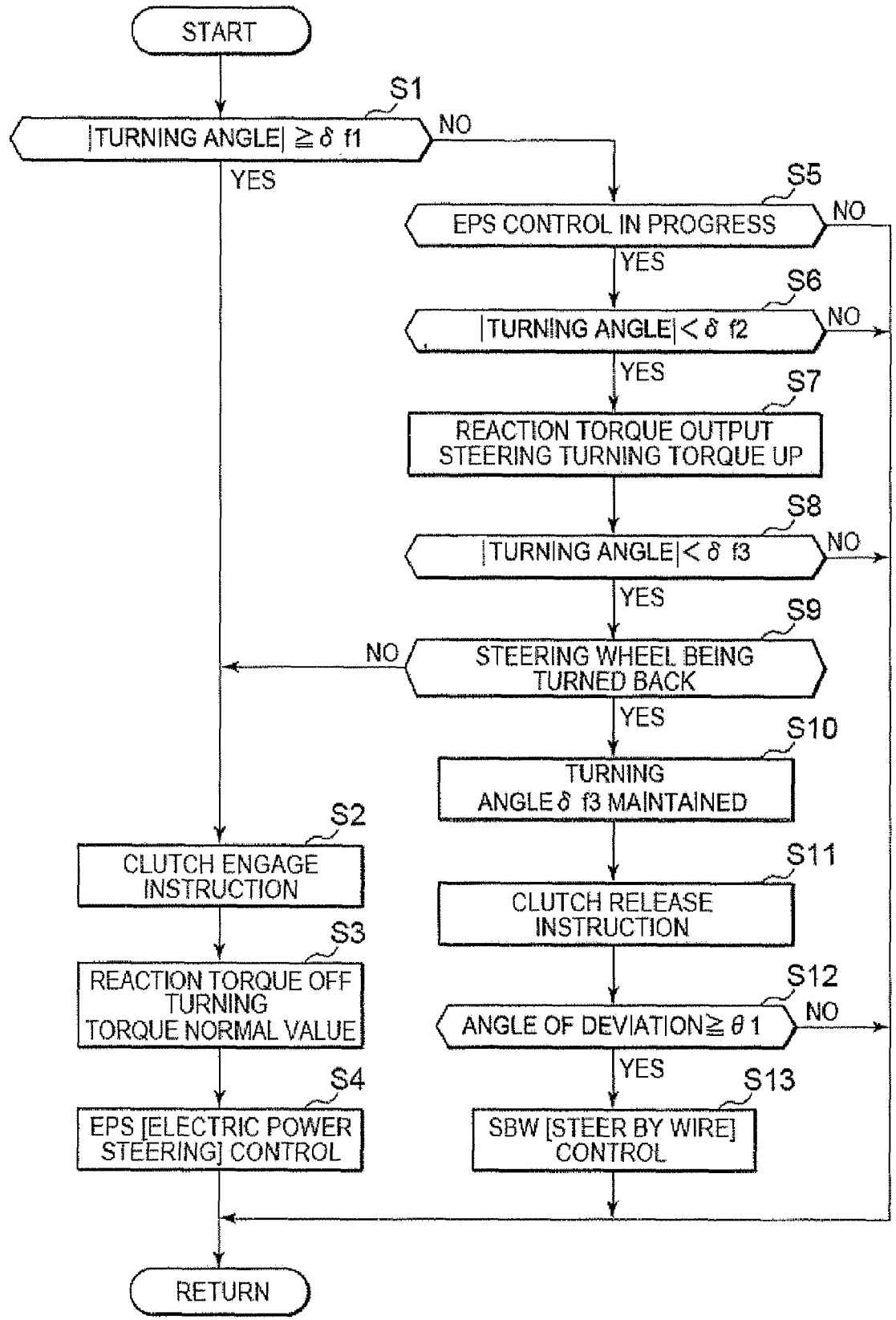
FIG. 5 is a flow chart showing the steering control processing executed by a controller of the vehicle steering device according to the first embodiment.

At step S10 in the flow chart in FIG. 5, the turning angle is fixed when the turning angle δ f3 is maintained upon output of a clutch release instruction, and only the steering angle changes in a direction whereby the torque acting in the direction of clutch engagement will be reduced. The torque acting in the direction of engagement can therefore be reduced more quickly, and the clutch 5 can be reliably released.

Also at step S12, flow advances to step S13, and steer-by-wire control is initiated only when the angle of deviation between the steering angle and the turning angle is θ1 or greater. That is, the torque acting in the direction of engagement is sufficiently reduced when the angle of deviation between the steering angle and the turning angle reaches or exceeds the prescribed value of θ1. Thus, the rollers 32 caught between the outer ring 30 and the inner ring 31 are released, and the clutch 5 is reliably released. By shifting to steer-by-wire control starting at this time point, steer-by-wire control can be executed with the clutch 5 reliably released, and steering wheel pull can be prevented.

In addition, at step S7 a steering reaction force is applied by the reaction motor 4 and processing is performed to increase the turning angle torque by the amount of the steering reaction force provided. That is, by outputting the steering reaction force before the clutch release instruction when shifting from EPS control to steer-by-wire control, steering wheel play that is caused by a lag in the increase of the reaction force output can be prevented. Also, by canceling the steering reaction force generated by the reaction motor 4 with increased vehicle wheel turning torque by increasing the vehicle wheel turning torque, fluctuation in the torque transmitted to the steering wheel 1 can be prevented, and change in the steering torque felt by the driver can be controlled.

Steering wheel turn-back is determined at step S9. Only when the steering wheel 1 is turned back does flow advance from step S10→step S11, whereupon a clutch release instruction is output. In short, when the steering wheel 1 is turned back, because this is in the direction whereby the torque acting in the direction of engagement will be reduced, release of the clutch 5 is reliably accomplished by outputting a clutch release instruction at that time.

On the other hand, if steering is increased at step S9, the flow from step S1→step S5→step S6→step S7→step S8→step S9→step S2→step S3→step S4 is repeated, and EPS control is continued. When the steering wheel 1 is turned further, the clutch 5 is acted on in the direction of engagement so that there is the risk of the clutch 5, which was temporarily released, engaging again. In this case, the occurrence of steering wheel pull, which is due to the fact that steer-by-wire control is performed while the clutch 5 has not been released, can be prevented by continuing EPS control.

Then, when the steering wheel 1 is turned back and the angle of deviation between the steering angle and the turning angle reaches or exceeds the prescribed value θ1 while EPS control is maintained, flow advances from step S1→step S5→step S6→step S7→step S8→step S9→step S10→step S11→step S12→step S13, and steer-by-wire control is started. In short, when shifting to EPS steering control as the steering wheel is turned further, if it is determined that it is possible to go from EPS control to steer-by-wire control, a determination to transition to steer-by-wire control is made based on the angle of deviation between the steering angle and the turning angle at the point of steering back, so it is possible to return to steer-by-wire control quickly.

Figure 7:
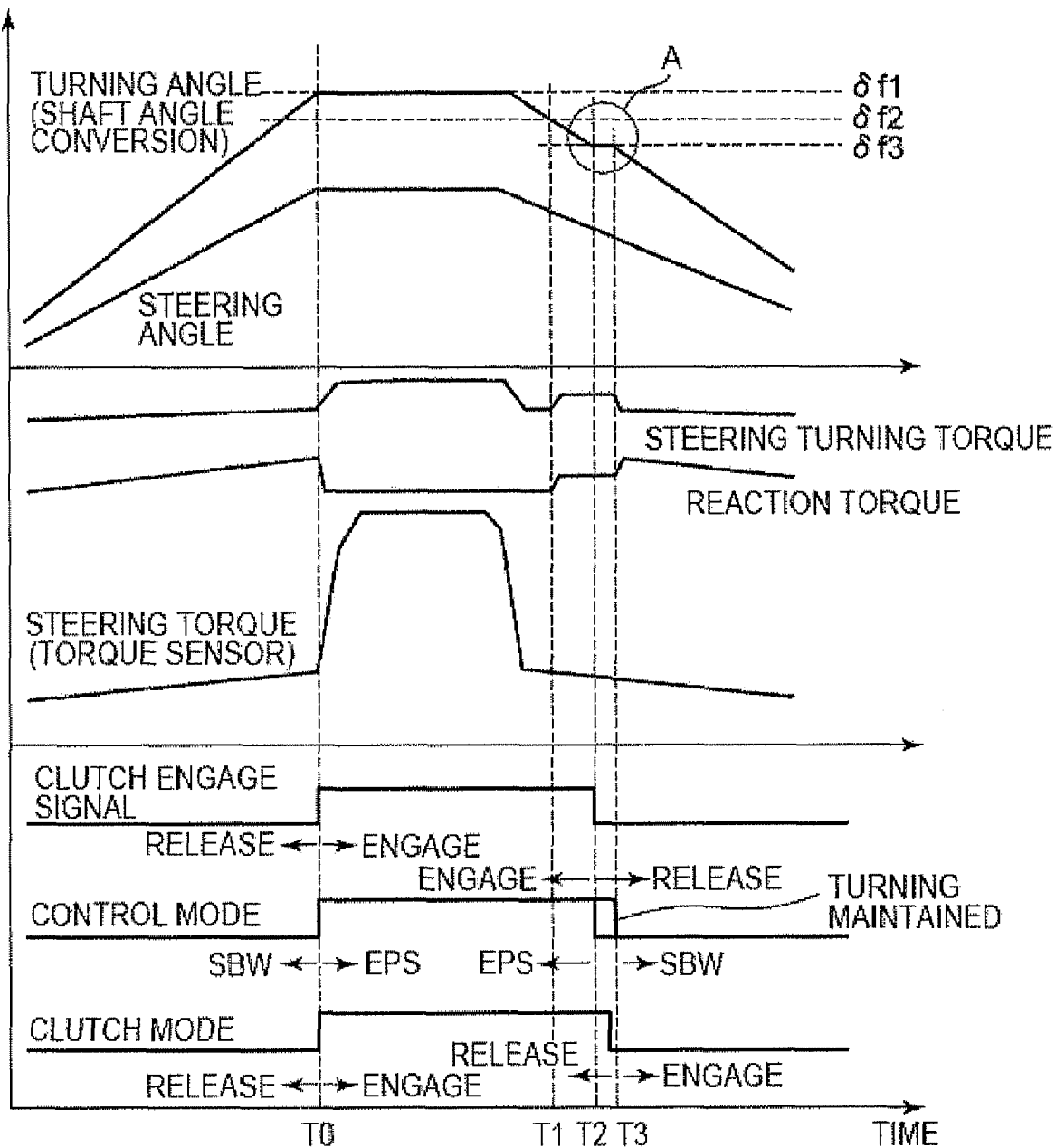
FIG. 7 is a timing chart showing operating characteristics of the vehicle steering device according to the first embodiment.

FIG. 7 is a timing chart showing the operation to prevent steering wheel pull in the vehicle steering device of the first embodiment when the clutch 5 is engaged at the maximum turning angle in order to go from steer-by-wire control to EPS control, and when the clutch 5 is released upon steering back in order to return from EPS control to steer-by-wire control. It shows the operation when the steering angle is turned back after the turning angle has reached the maximum turning angle (that is, at the rack end) when the driver turns the steering wheel further.

First, when the turning angle reaches δ f1 at time point T0, a clutch engage instruction is output and the system goes from steer-by-wire control to EPS control. The reaction force torque that was being output up to then is simultaneously turned off, and the vehicle wheel turning torque becomes the vehicle wheel turning assist torque produced by EPS control. When the turning angle becomes less than δ f2 at time point T1 upon the driver turning the steering angle back, reaction force torque is output and the steering angle torque is also increased by the amount of the reaction force torque. When the driver turns the steering angle further back and the turning angle becomes less than δ f3 at time point T2, the turning angle is held at δ f3. A clutch release instruction is output.

Figure 8:
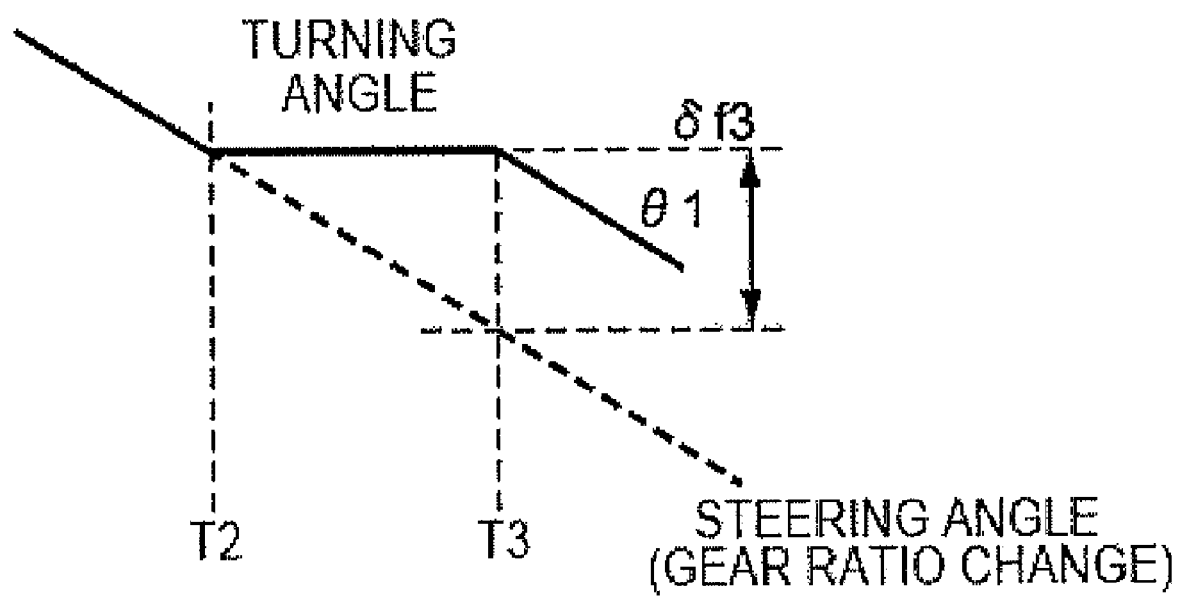
FIG. 8 is a detail view showing area A of FIG. 7.

At this time, because the driver continues steering back, the angle of deviation between the steering angle and the turning angle held at δ f3 gradually becomes larger, and when the angle of deviation reaches or exceeds θ1 at time point T3 (refer to FIG. 8), the system goes to steer-by-wire control. The torque acting in the direction of clutch engagement is reduced, and the clutch 5 is reliably released between time points T2 and T3 as described above. Thus, it is possible to go to steer-by-wire control reliably starting at time point T3.

In the vehicle steering device of the first embodiment, since the steering controller 10 controls the turning angle so that the change in turning angle of the front wheels 9 will be smaller than the change in the steering angle when a clutch release instruction is output, the occurrence of steering wheel pull when shifting from EPS control to steer-by-wire control can be prevented.

Also, in the vehicle steering device of the first embodiment, since the steering controller 10 holds the turning angle at angle δ f3 when a clutch release instruction is output, the turning angle is fixed. Only the steering angle changes in a direction in which the torque acting in the direction of engagement will be reduced. Therefore, the torque acting in the direction of engagement can be reduced more quickly, and the clutch 5 may be reliably released.

Furthermore, in the vehicle steering device of the first embodiment, since the steering controller 10 starts steer-by-wire control when the angle of deviation between the steering angle and the turning angle reaches or exceeds the prescribed value θ1 after a clutch release instruction is output, the torque acting in the direction of engagement is sufficiently reduced by the angle of deviation between the steering angle and the turning angle having reached or exceeded prescribed value θ1. The clutch 5 may be reliably released. By shifting to steer-by-wire control starting at this time point, steer-by-wire control can be performed with the clutch 5 reliably disengaged, and steering wheel pull can be prevented.

Additionally, in the vehicle steering device of the first embodiment, since the steering controller 10 causes a steering reaction force to be applied to the steering wheel 1 before a clutch release instruction is output and also increases the steering torque of the vehicle wheel turning mechanism 8 by the amount of the reaction force applied, the steering wheel play that would otherwise be caused by a lag in the increase of reaction motor output when shifting from EPS control to steer-by-wire control can be prevented. Also, because the reaction force torque is added to the torque produced by external road surface forces only when reaction force torque is output during EPS control, the torque from external road surface forces is decreased. Fluctuation in the steering torque felt by the driver can be controlled by making the EPS control assist larger.

Moreover, in the vehicle steering device of the first embodiment, since a clutch release instruction is output when the steering wheel 1 is turned back (in step S11), steer-by-wire control is commenced when the steering wheel 1 is moving in a direction whereby the torque acting in the direction of engagement will be reduced. The clutch 5 is reliably disengaged by outputting a clutch release instruction at this time.

Furthermore, in the vehicle steering device of the first embodiment, since the steering controller 10 holds the turning angle at angle δf3 when a clutch release instruction is output, and maintains EPS control when the steering wheel 1 is turned further during this control to maintain the turning angle, the occurrence of steering wheel pull due to steer-by-wire control being performed while the clutch is not yet disengaged can be prevented.

Additionally, in the vehicle steering device of the first embodiment, since the steering controller 10 starts steer-by-wire control when steering wheel 1 is turned back again with EPS control being maintained while the driver continues to turn the wheel until the angle of deviation between the steering angle and the turning angle reaches or exceeds a prescribed value θ1, it is possible to return to steer-by-wire control quickly.

In a vehicle steering device according to a second embodiment of the invention, control to return to steer-by-wire control again is performed when the system goes from steer-by-wire control to EPS control when a curb or other obstacle is driven over and the steering wheel is turned back. Here, the system configuration is the same as in the vehicle steering device according to the first embodiment, so repeated explanations are omitted.

When the steering controller 10 determines that a curb is being driven over from the turning current of the vehicle wheel turning motor 6, the clutch 5 is engaged in order to transition from steer-by-wire control to EPS control. Subsequently, after it is determined that the curb is no longer being driven over based on the vehicle wheel turning current, the vehicle steering device transitions from EPS control to steer-by-wire control.

Figure 9:
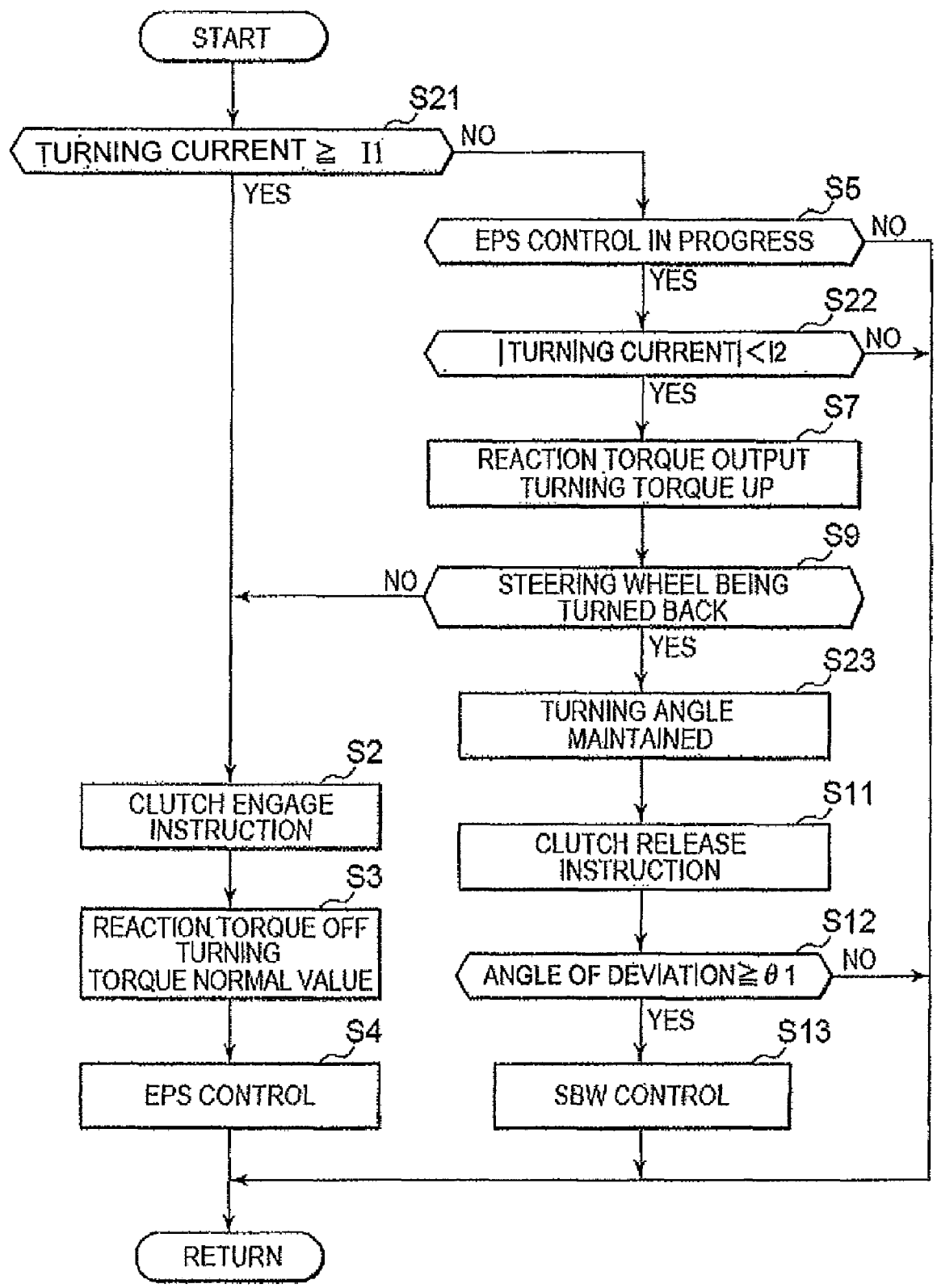
FIG. 9 is a flow chart showing the steering control processing executed by a controller of the vehicle steering device according to a second embodiment of the invention.

FIG. 9 is a flow chart showing the flow of the steering control processing executed by the steering controller 10 of the vehicle steering device according to the second embodiment. Here, the same step numbers are assigned to steps wherein the same processing is performed as in the first embodiment shown in FIG. 5, and an explanation of those steps is omitted.

At step S21 it is determined whether a curb is being driven over by evaluating whether the absolute value of the vehicle wheel turning current is a prescribed value I1 or greater. When the absolute value of the vehicle wheel turning current is a prescribed value I1 or greater, step S21 evaluates as "YES," and flow goes to step S2. When the absolute value of the vehicle wheel turning current is less than a prescribed value I1, step S21 evaluates as "NO," and flow goes to step S5. Here, I1 is a relatively large value that the vehicle wheel turning current will not exceed (70A, for example) when traveling normally (that is, when no curb is being driven over).

At step S22 it is determined whether the absolute value of the vehicle wheel turning current is less than a prescribed value I2. When the absolute value of the vehicle wheel turning current is less than a prescribed value I2, step S22 evaluates as "YES," and flow goes to step S7. When the absolute value of the vehicle wheel turning current at or greater than a prescribed value I2, step S22 evaluates as "NO," and flow goes to RETURN. In this example, I2 is a value smaller than I1.

At step S23 a turning angle instruction is output to hold the turning angle at the angle at the time that steering back was determined in step S9, and flow goes to step S11.

Figure 10:
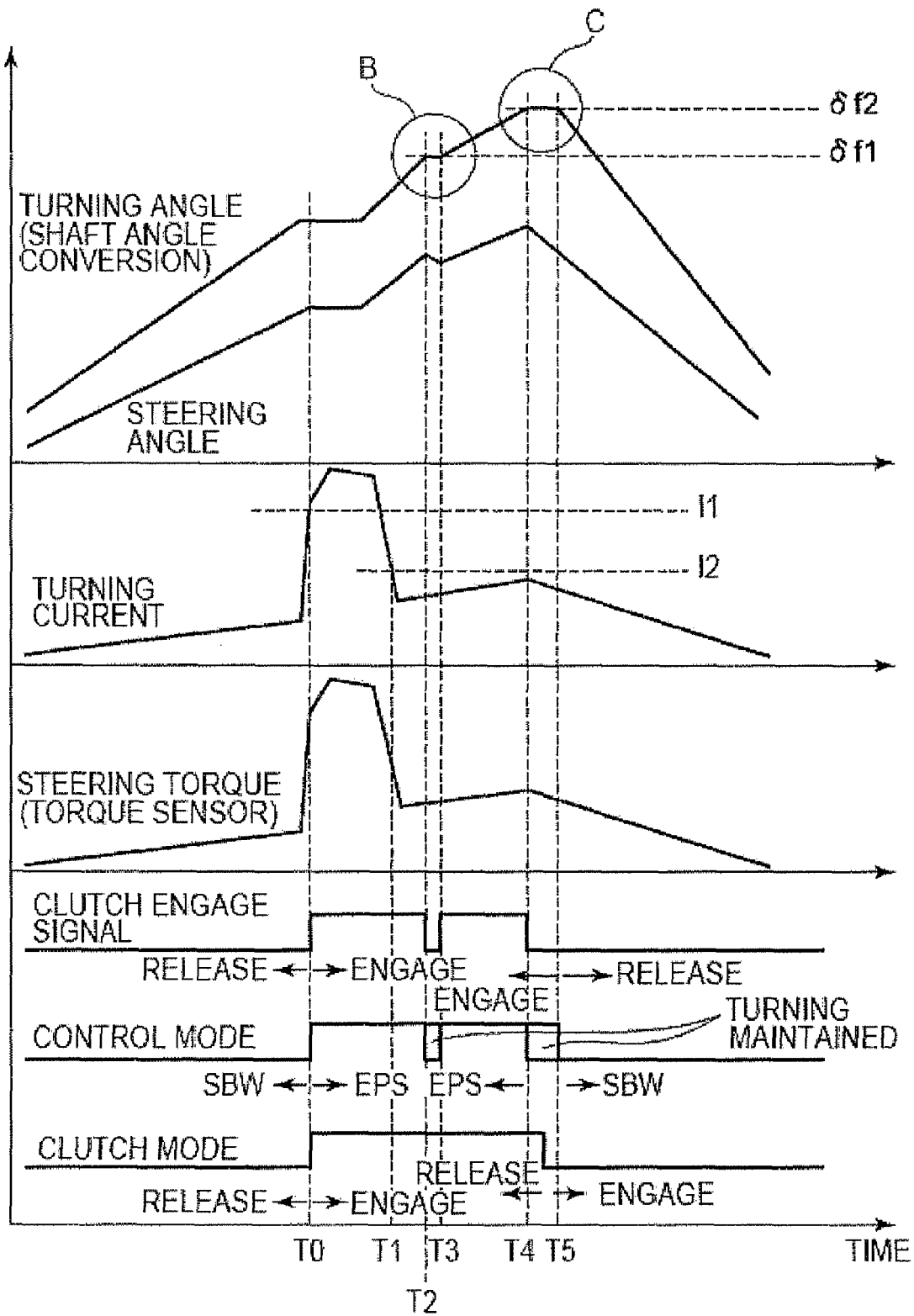
FIG. 10 is a timing chart showing operating characteristics of the vehicle steering device according to the second embodiment.

Operation of the vehicle steering device according to the second embodiment is now explained with reference to FIG. 10, which is a timing chart showing the steering wheel pull prevention operation in the second embodiment when the clutch 5 is engaged to go from steer-by-wire control to EPS control when a curb is being driven over, and the system returns to steer-by-wire control from EPS control after the curb has been driven over. FIG. 10 shows the operation in a situation in which the front wheels 9 contact the curb while the driver is turning the steering wheel further, and after it has been driven over, the steering angle is turned back.

When the front wheels 9 contact the curb while the driver is steering, the turning angle stops changing since the turning motor 6 cannot provide sufficient force to continue turning the wheel into the curb. Accordingly, the difference between the instructed turning angle and the actual turning angle becomes larger. In response, the steering angle current becomes larger. When the vehicle wheel turning current reaches a prescribed value I1 or greater at time point T0, a clutch engage instruction is output, and the system goes from steer-by-wire control to EPS control. By shifting to EPS control from steer-by-wire control, the driver's steering force can also be used as vehicle wheel turning force when a curb is being driven over.

When the curb has been driven over, the vehicle wheel turning current decreases to that in the normal control mode. When the driver turns the steering angle back at time point T2, the turning angle is held at the angle δ f1 as it was when turning back was determined (in step S23), and a clutch release instruction is output (in step S11). At this time, when the driver turns the steering angle further again at time point T3, as best seen in FIG. 11A, before the angle of deviation between the steering angle and the turning angle reaches or exceeds the prescribed value θ1, because the direction is one in which the torque acting in the direction of clutch engagement will increase, there is the risk of the clutch not being released by the clutch release instruction. Therefore, EPS control is again performed (step S9→step S2).

When the driver turns the steering angle back again at time point T4, the turning angle is held at the angle δ f2 as it was when turning back was detected (in step S23), and a clutch release instruction is output (in step S11). Because the driver continues steering back, the angle of deviation between the steering angle and the turning angle held at δf2 becomes larger. When the angle of deviation reaches or exceeds the prescribed value θ1 at time point T5 as best seen in FIG. 11B, the system goes to steer-by-wire control (step S12→step S13). Because the torque acting in the direction of clutch engagement is reduced, and the clutch is released between time points T4 and T5 as described above, it is possible to go to steer-by-wire control reliably starting at time point T5.

In a vehicle steering device according to a third embodiment of the invention, the steering device transitions from steer-by-wire control to EPS control in response to a drop in the power source voltage, and returns to steer-by-wire control when the power source voltage is sufficiently recovered. In this manner, power consumption may be reduced, and a power source voltage drop may be avoided. Here, the system configuration is the same as in the first embodiment, so repetitive explanations are omitted.

When a drop in the power source voltage is detected, the steering controller 10 engages the clutch 5 to transition from steer-by-wire control to EPS control. After this, when the power source voltage is determined to have recovered sufficiently, the system goes from EPS control to steer-by-wire control.

Figure 12:
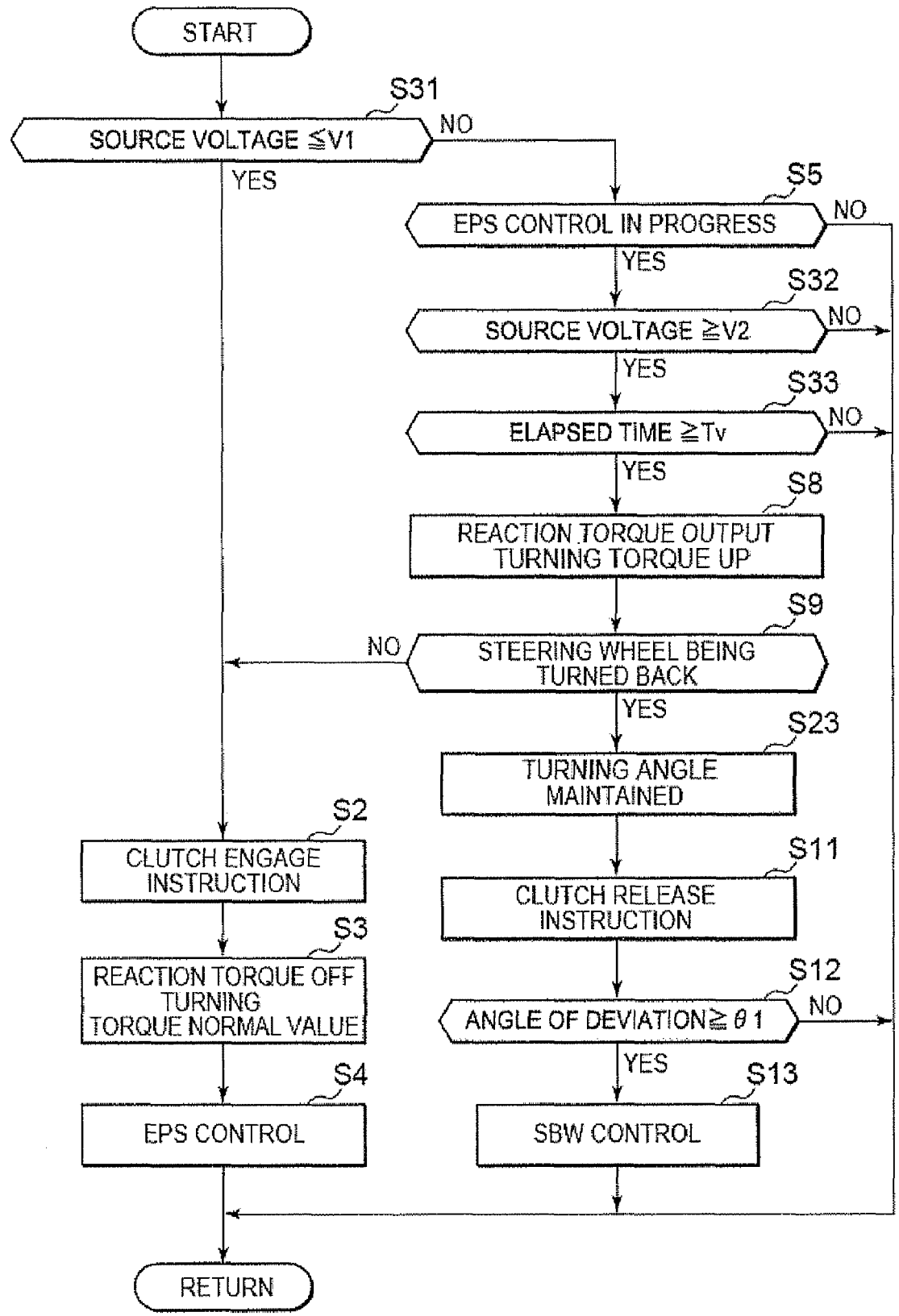
FIG. 12 is a flow chart showing the steering control processing executed by a controller of the vehicle steering device according to a third embodiment of the invention.

FIG. 12 is a flow chart showing the flow of the steering control processing executed by the steering controller 10 in the steering device according to the third embodiment, and each step is explained below. Here, the same step numbers are assigned to steps wherein the same processing is performed as in the first embodiment as shown in FIG. 5 so explanations of those steps are omitted.

At step S31 whether the power source voltage is at or below a prescribed value V1 is determined. When the power source voltage is at or below the prescribed value V1, step S31 evaluates as "YES," and flow goes to step S2. Otherwise, step S31 evaluates as "NO," and flow goes to step S5. Here, V1 is set to a tolerance value (10V, for example) corresponding to a threshold value leading to abnormalities in the system (that is, a performance drop caused by insufficient voltage).

At step S32 whether the power source voltage is at or above a prescribed value V2 is determined. When the power source voltage is at or below the prescribed value V2, step S32 evaluates as "YES," and flow goes to step S33. Otherwise, step S32 evaluates as "NO," and flow goes to RETURN. Here, V2 is a value larger than V1.

At step S33 whether the power source voltage has been at or above V2 for a prescribed time Tv or greater is determined. When the power source voltage has been at or above V2 for a prescribed time Tv or greater, step S33 evaluates as "YES," and flow goes to step S7. Otherwise, step S33 evaluates as "NO," and flow goes to RETURN. Time Tv is a value during which the power source voltage can be determined to have recovered sufficiently (5 minutes, for example).

Figure 13:
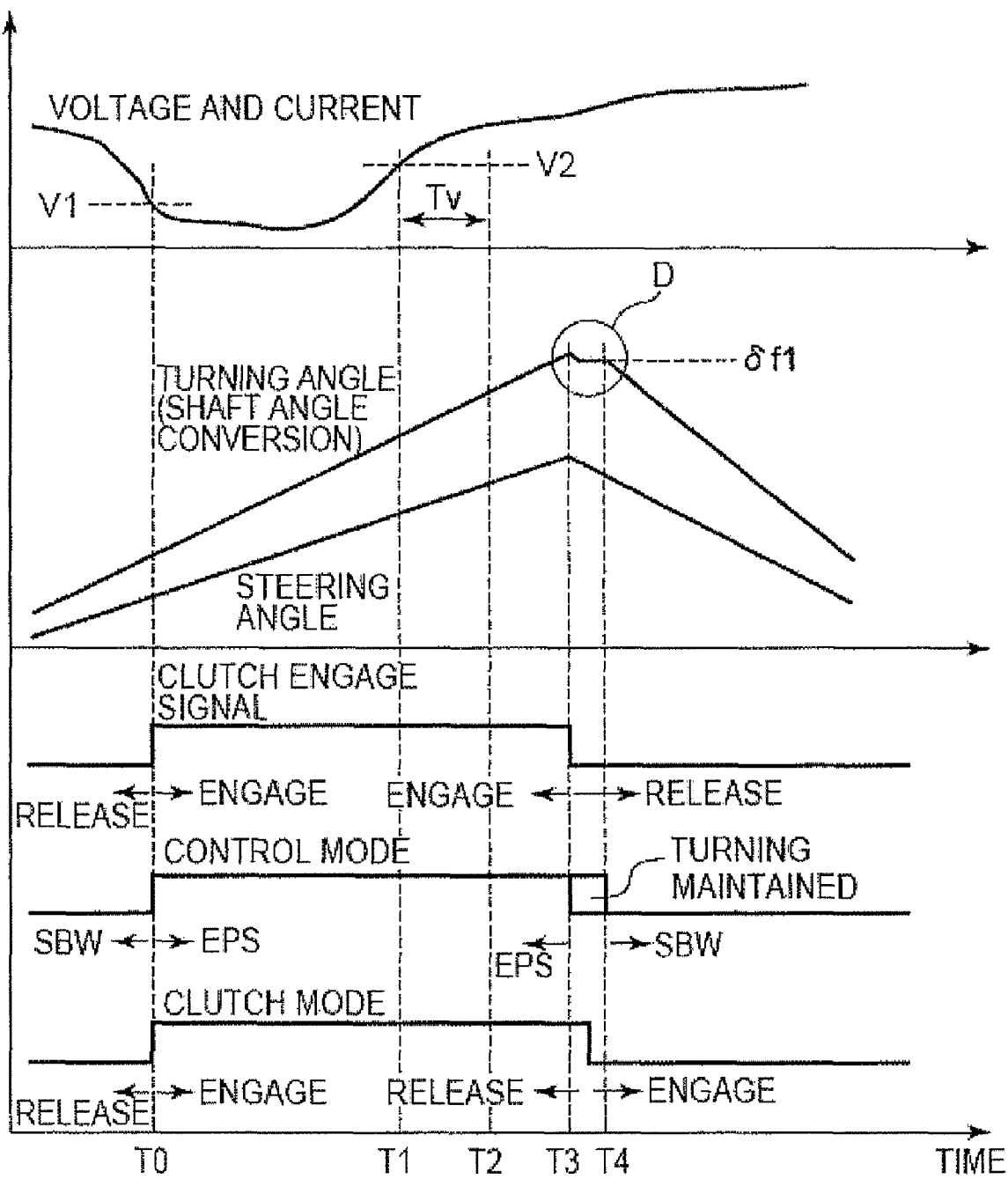
FIG. 13 is a timing chart showing operating characteristics of the vehicle steering device according to the third embodiment.

Operation of the vehicle steering device according to the third embodiment is next explained with reference to FIG. 13, which is a timing chart showing steering wheel pull prevention operation in the steering device according to the third embodiment. The system goes from steer-by-wire control to EPS control when the power source voltage drops, and goes to steer-by-wire control from EPS control when the power source voltage has recovered. The timing chart shows the operation in a situation in which the driver turns the wheel further when power source voltage drops and turns the steering angle back after power source voltage recovers.

When the power source voltage drops and is at or below prescribed value V1 at time point T0, a clutch engage instruction is output. The system goes from steer-by-wire control to EPS control. By shifting from steer-by-wire control to EPS control, battery power consumption can be reduced.

Figure 14:
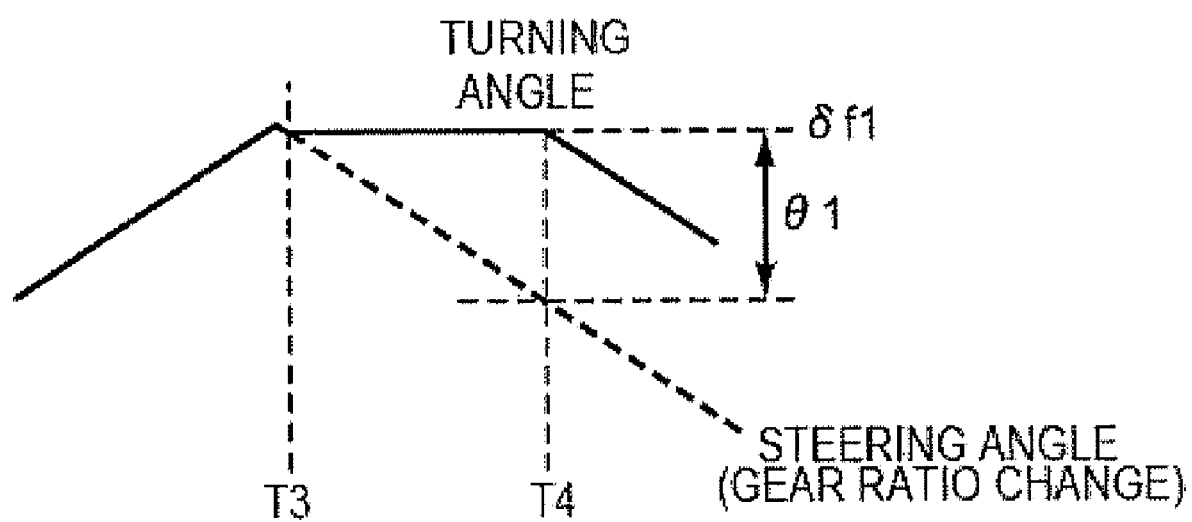
FIG. 14 is a detail view showing area D of FIG. 13.

When power source voltage recovers to a prescribed value V2 or greater at time T1, and this state has lasted for a prescribed time Tv or greater, it is possible to go to steer-by-wire control. When the driver turns the steering angle back at time T3, the turning angle is held at angle δ f1 that it was at when turned back (step S23), and a clutch release instruction is output (step S11). Because the driver continues to steer back, the angle of deviation between the steering angle and the turning angle held at δ f1 becomes larger, and when the angle of deviation reaches or exceeds the prescribed value θ1 at time point T4 (FIG. 14), the system goes to steer-by-wire control (step S12→step S13). Because the torque acting in the direction of clutch engagement is reduced and the clutch is released between time points T3 and T4 as described above, it is possible to go to normal steer-by-wire control reliably starting at time point T4.

In a vehicle steering device according to a fourth embodiment of the invention, rather than determining that the clutch 5 has been released when it is sensed that the angle of deviation between the steering angle and the turning angle has reached or exceeded a prescribed value (θ1) while the turning angle is being held constant as in the first through third embodiments, the clutch 5 is released by driving the vehicle wheel turning motor 6 so that the turning angle will be smaller than the steering angle. Here, the system configuration is the same as in the first embodiment so its explanation is omitted.

Figure 15:
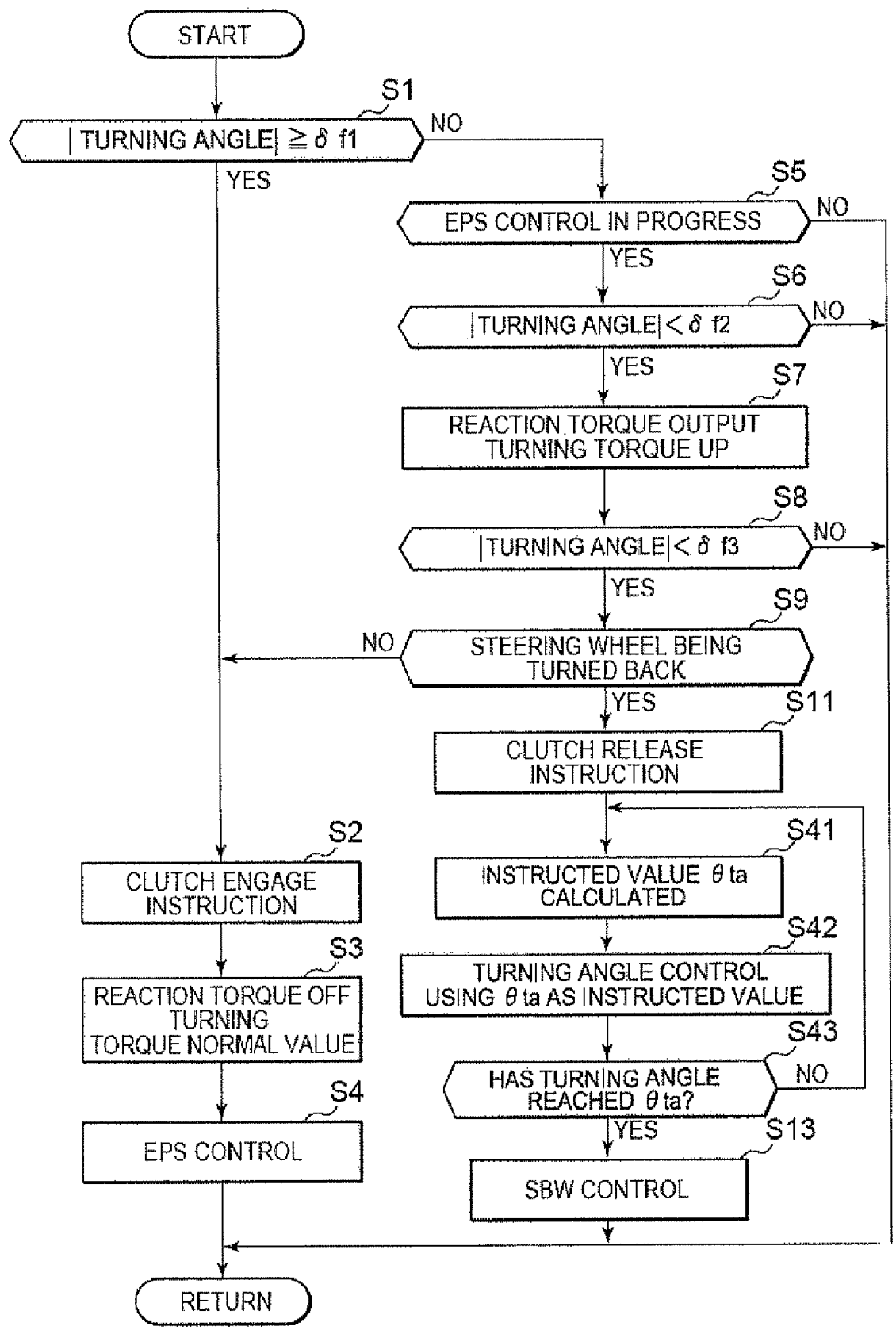
FIG. 15 is a flow chart showing the steering control processing executed by a controller of the vehicle steering device according to a fourth embodiment of the invention.

FIG. 15 is a flow chart showing the flow of steering control processing executed by the steering controller 10 in the fourth embodiment, and each step is explained below. The same step numbers are assigned to steps wherein the same processing is performed as in the first embodiment as shown in FIG. 5, so explanations of those steps are omitted.

After a clutch release instruction is output at step S11, the instructed turning angle θ ta (θ ta=θs−θ1) is calculated at step S41 so that the value of the turning angle θt (the angle of rotation of pinion shaft 17) subtracted from steering angle θs (the angle of rotation of steering wheel shaft 79) will be a prescribed angle θ1 for disengaging the clutch 5, whereupon flow goes to step S42. The prescribed angle θ1 required to disengage the clutch 5 is a predetermined value that is the same as that in the first embodiment in this example.

At step S42 the instructed turning angle is transmitted to the turning controller 11 to perform vehicle wheel turning control so that the front wheels 9 are steered based on the instructed turning angle θ ta calculated in step S41, whereupon flow goes to step S43.

At step S43 whether the actual turning angle has been changed to θ ta by the turning angle control performed at step S42 (that is, whether the turning angle has reached θ ta) is determined based on the turning angle sensed by the turning angle sensor 7. When the angle has been so changed, clutch release control is ended, and flow advances to step S13. When the angle has not so changed, flow goes to step S41, and the instructed turning angle θ ta is calculated again. Angle θ ta is calculated again because the instructed turning angle θta for releasing the clutch 5 must also be changed since the steering angle θs changes in the course of steering.

In the fourth embodiment, the clutch 5 is released by active vehicle wheel turning of driving vehicle wheel turning motor 6 so that the turning angle will be smaller than the steering angle, as stated above. For this reason, the clutch 5 can be disengaged more reliably and quickly in comparison to when the turning angle is held constant until it is sensed that the angle of deviation between the steering angle and the turning angle has reached or exceeded a prescribed value (θ1) as in FIGS. 1-3. Here, the processing from step S11 to step S43 is also termed clutch release control.

Operation of the vehicle steering device of the fourth embodiment is now described for two separate cases. First, the operation to prevent steering wheel pull in the vehicle steering device of the fourth embodiment is explained wherein the steering gear ratio (the ratio of the turning angle to the steering angle, which is also the ratio of the angle of rotation of the pinion shaft 17 to the angle of rotation of the steering wheel shaft 79) is less than 1. Second, the operation to prevent steering wheel pull in the vehicle steering device of the fourth embodiment is explained wherein the steering gear ratio is greater than 1.

Figure 16:
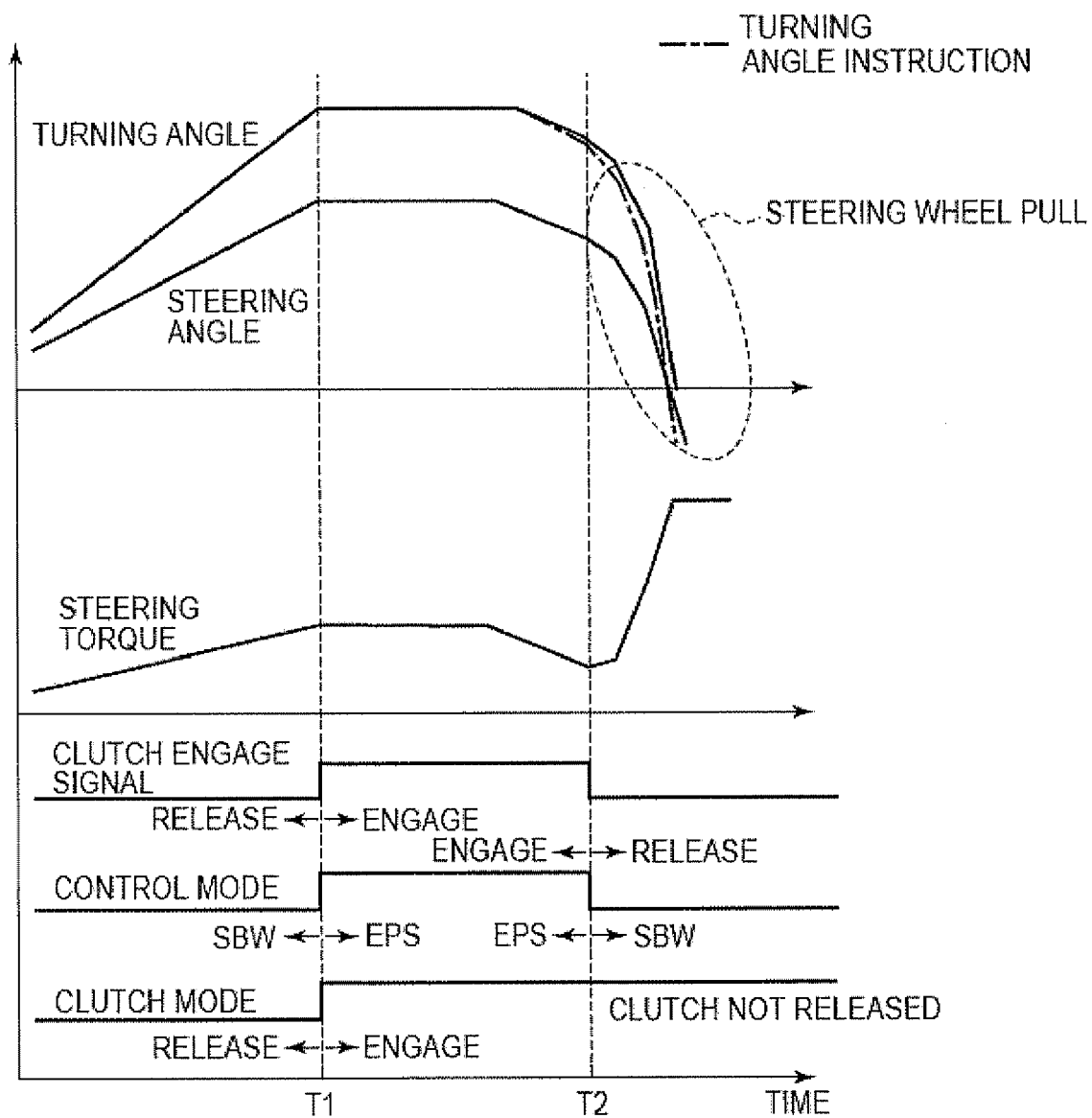
FIG. 16 is a timing chart showing operating characteristics of known steer-by-wire-systems when the ratio of the instructed turning angle to the steering angle is less than 1 during steer-by-wire control after clutch release.

With regard to prior steer-by-wire systems, FIG. 16 shows various waveforms when the ratio (hereafter steering gear ratio) Gr of steering angle θs to the instructed turning angle θ ta (that is, Gr=θ ta/θs) is smaller than 1, with steer-by-wire control after a clutch release instruction.

In known steer-by-wire systems, after shifting from steer-by-wire control to EPS control with the clutch engaged at time point t1, to transition to steer-by-wire control at time point t2, the clutch 5 remains engaged if a large torque is applied in the direction of engagement of the clutch 5 when a release instruction has been produced for the clutch 5. For this reason, the pinion shaft 17 and the steering wheel shaft 79 remain connected, so that steering wheel 1 and vehicle wheel turning mechanism 8 are mechanically coupled.

When the driver continues to turn the steering wheel in this state, because the steering gear ratio for steer-by-wire control has been set smaller than 1, the instructed turning angle θ ta will be smaller than the steering angle θs, and the vehicle wheel turning motor 6 will generate a vehicle wheel turning torque in a direction to check continued steering. For this reason, if the driver applies steering torque to the steering wheel 1 to overcome the vehicle wheel turning torque, it will become impossible to steer with the steering wheel 1, and there is the risk of the steering wheel being pulled.

Figure 17:
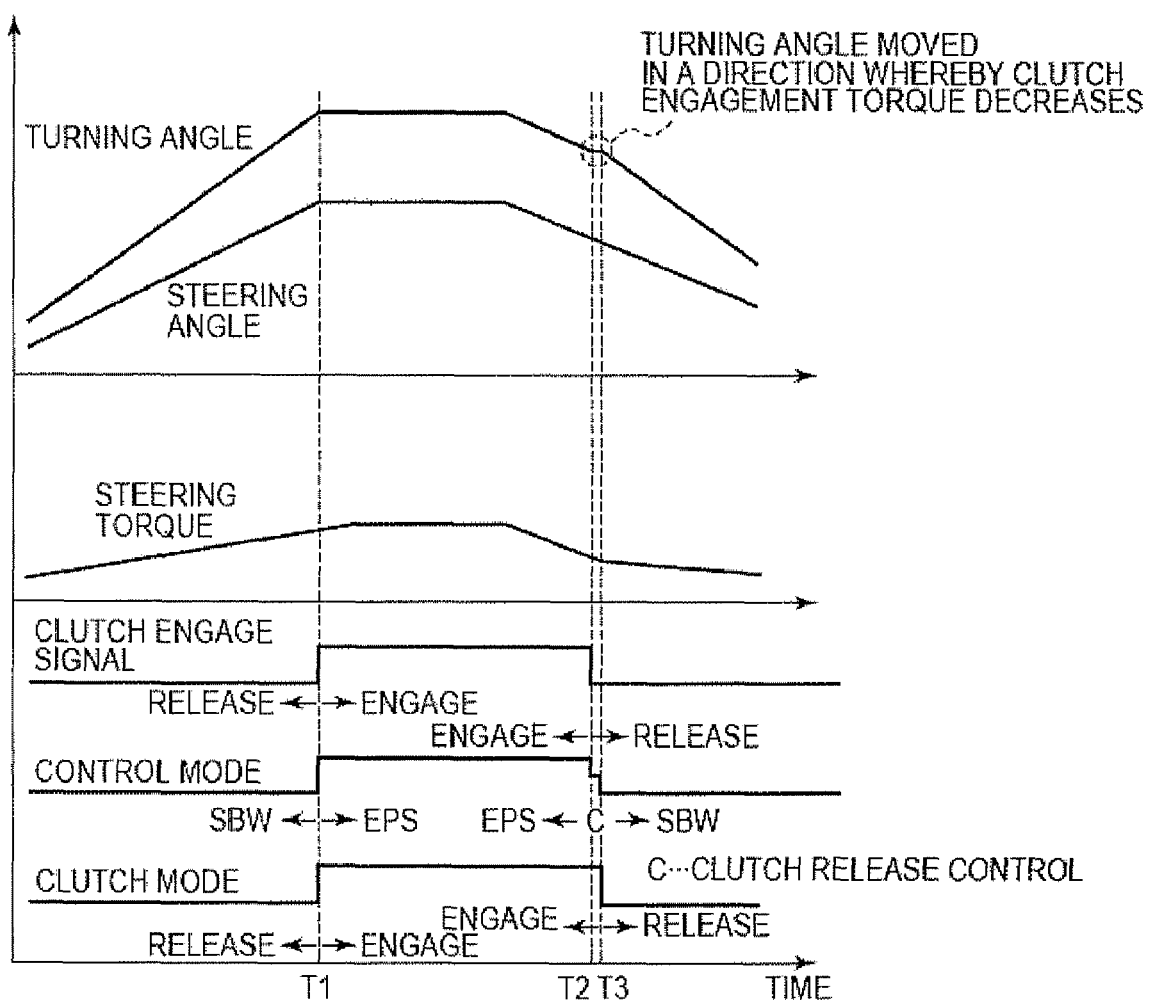
FIG. 17 is a timing chart showing operating characteristics of the vehicle steering device according to the fourth embodiment when the ratio of the instructed turning angle to the steering angle is less than 1 during steer-by-wire control after clutch release.

In contrast to this, in the steering device according to the fourth embodiment, as shown in FIG. 17, when shifting to steer-by-wire control from a state in which the clutch is engaged at time point t2, clutch release is controlled without an immediate shift to steer-by-wire control (step S11→step S41→step S42→step S43). With this clutch release control, a clutch release instruction is output (step S11), and the vehicle wheel turning motor 6 is driven in a direction in which clutch engagement torque will decrease to lessen the degree of engagement of the clutch 5 (step S42).

After this, whether the turning angle has reached θ ta at time point t3 is determined (step S43). When the turning angle has reached θ ta, the system goes to steer-by-wire control from clutch release control (step S43→step S13). In this way, the clutch 5 can be reliably released, so that after time point t3 when the transition to steer-by-wire control occurs, steering wheel pull will not occur even when the driver continues to turn steering wheel 1.

Figure 18:
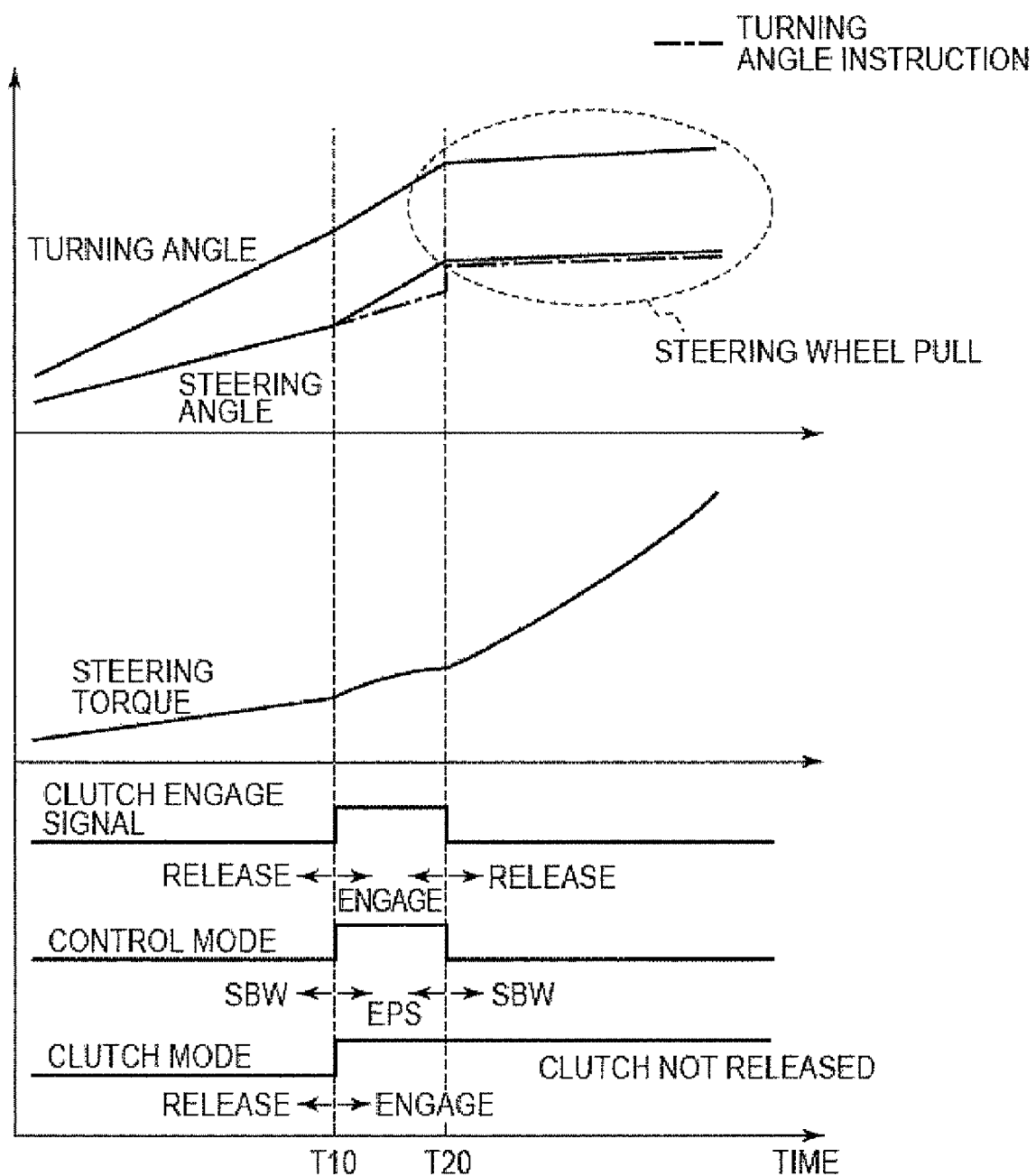
FIG. 18 is a timing chart showing operating characteristics of known steer-by-wire-systems when the ratio of the instructed turning angle to the steering angle is greater than 1 during steer-by-wire control after clutch release.

With regard to known steer-by-wire systems, FIG. 18 shows various waveforms when steering gear ratio Gr is controlled to be greater than 1 during steer-by-wire control after a clutch release instruction.

In known steer-by-wire systems, after shifting from steer-by-wire control to EPS control with the clutch engaged at time point t10 and while transitioning to steer-by-wire control at time point t20, although a release instruction for the clutch 5 is produced, the clutch 5 will remain engaged when a large torque is applied in the direction of engagement of the clutch 5. For this reason, the pinion shaft 17 and the steering wheel shaft 79 remain connected, and the steering wheel 1 and the vehicle wheel turning mechanism 8 are mechanically coupled.

When the driver tries to turn the steering wheel back in this state, because the steering gear ratio for the steer-by-wire control has been set greater than 1, the amount of change in instructed turning angle θ ta will be larger than the amount of change of steering angle θs, and the vehicle wheel turning motor 6 will generate torque in a direction to try to steer back. Because the steering wheel 1 and the vehicle wheel turning mechanism 8 are mechanically coupled at this time, the steering wheel 1 moves because the front wheels are being turned and driven, a cycle develops wherein the instructed turning angle changes further because of this, the front wheels are turned, and there is the risk of the steering wheel being pulled.

Figure 19:
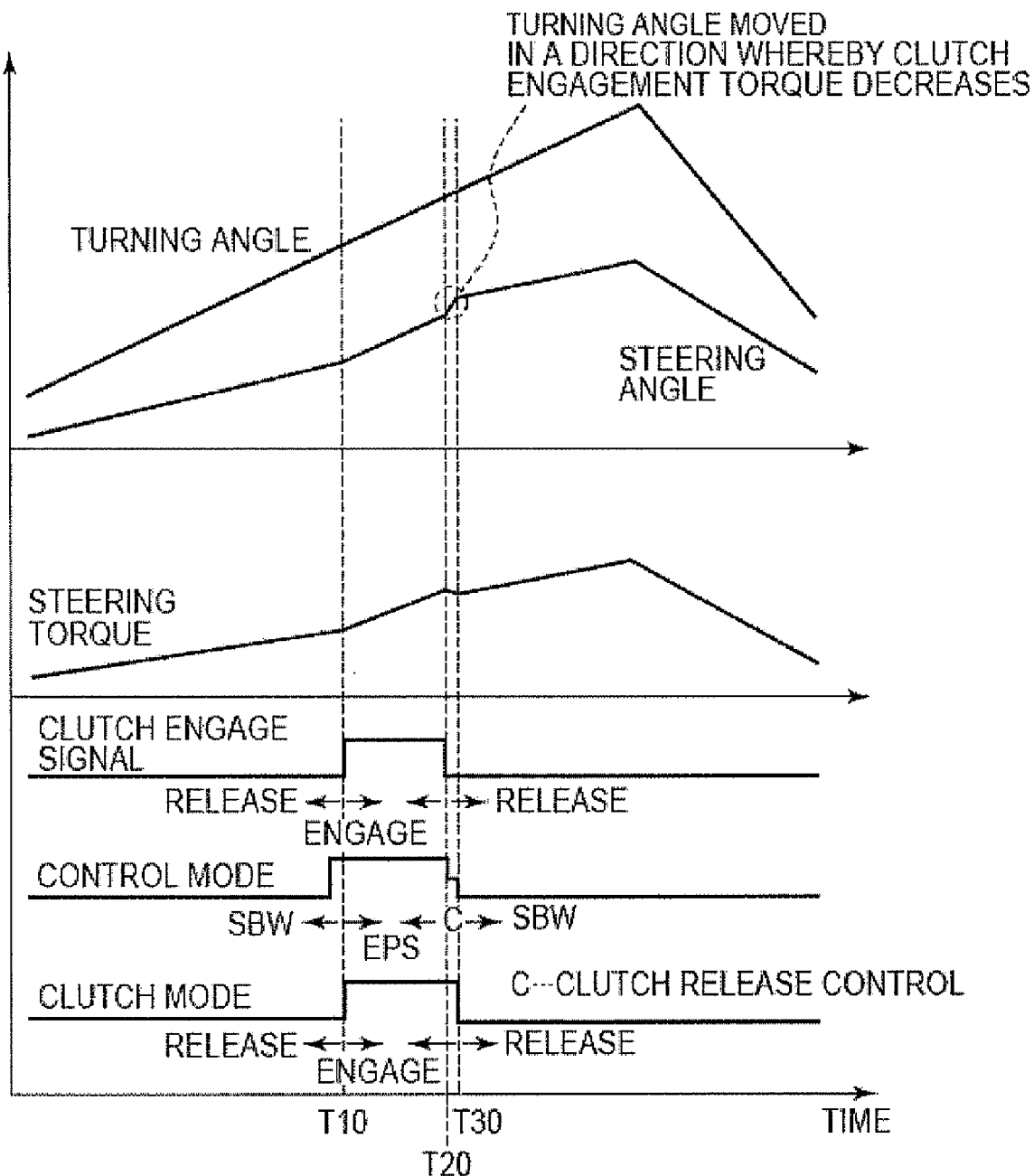
FIG. 19 is a timing chart showing operating characteristics of the vehicle steering device according to the fourth embodiment when the ratio of the instructed turning angle to the steering angle is greater than 1 during steer-by-wire control after clutch release.

In contrast to this, in the fourth embodiment of the invention, when shifting to steer-by-wire control from a state in which the clutch is engaged at time point t20, clutch release is controlled without immediately shifting to steer-by-wire control (step S11→step S41→step S42→step S43) as shown in FIG. 19. With clutch release control, a clutch release instruction is produced (in step S11), vehicle wheel turning motor 6 is driven in a direction in which clutch engagement torque will decrease, and the degree of engagement of the clutch 5 is lessened (in step S42).

After this, whether the turning angle has reached θ ta at time point t30 is determined (in step S43), and when the turning angle has reached θ ta, the system goes to steer-by-wire control from clutch release control (step S43→S13). In this way, the clutch 5 can be released reliably, so that subsequent to the transition to steer-by-wire control at time point t30, steering wheel pull will not occur, even if the driver turns the steering wheel 1 back.

In the vehicle steering device of the fourth embodiment, when shifting to steer-by-wire control from a state in which the clutch 5 is engaged, steer-by-wire control is started after the performance of clutch release control wherein a clutch release instruction is output to the clutch 5, and the vehicle wheel turning motor 6 is driven so that the turning angle in the direction of disengagement of the clutch 5 will provide a prescribed angle of rotational deviation θa. In this way, steering wheel pull, which risks occurrence when starting steer-by-wire control while the clutch 5 is engaged, can be prevented.

Furthermore, in the vehicle steering device of the fourth embodiment, when shifting to steer-by-wire control from a state in which the clutch 5 is engaged, steer-by-wire control is started after the performance of clutch release control, wherein a clutch release instruction is output to the clutch 5, and the vehicle wheel turning motor 6 is driven to produce a torque in the direction of disengagement of the clutch 5 between the steering wheel shaft 79 and the pinion shaft 17. In this way, steering wheel pull can be prevented.

A vehicle steering device according to a fifth embodiment of the invention differs from the vehicle steering device of the fourth embodiment in that clutch release control to release the clutch 5 is performed only when it is estimated that the clutch 5 is engaged and not separated (not released) even when a clutch release instruction has been output, in that clutch release control to release the clutch 5 is performed only when the effect produced by clutch release control is small, and in the method for determining that the clutch has been released. Here, the system configuration is the same as the first embodiment, so its explanation is omitted.

Figure 20:
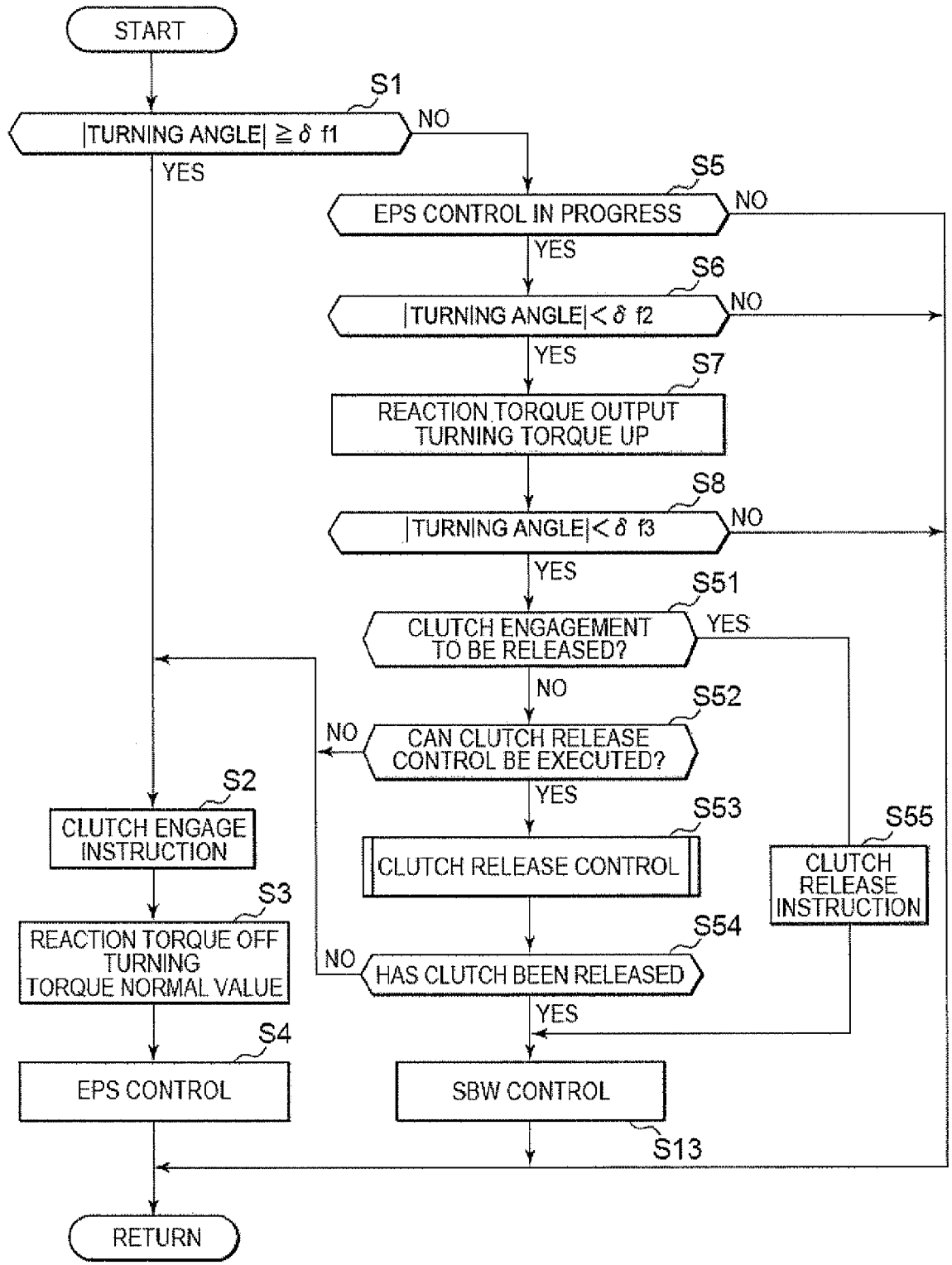
FIG. 20 is a flow chart showing the steering control processing executed by a controller of the vehicle steering device according to a fifth embodiment of the invention.

FIG. 20 is a flow chart showing the flow of steering control processing executed by the steering controller 10 in the fifth embodiment, and each step will be explained below. Here, the same step numbers are assigned to steps wherein the same processing is performed as in the first embodiment as shown in FIG. 5, and explanation of those steps is omitted.

At step S51 an estimate is made as to whether the clutch 5 will be disengaged when a clutch release instruction is output. When it is estimated that the clutch 5 will be disengaged, flow goes to step S55; and when it is estimated that the clutch 5 will not be disengaged, flow goes to step S52. Here, whether the clutch 5 will be disengaged is determined according to an estimation of the degree of engagement of the clutch 5. In short, the torque applied in the direction of rotation of the clutch 5 that engages or releases the steering wheel 1 and the vehicle wheel turning mechanism 8 is torque tending to rotate the steering wheel 1 (torque applied to the steering wheel shaft 79) and torque tending to rotate the pinion shaft 17 of the vehicle wheel turning mechanism 8. As an example of this torque, the torque sensed by the torque sensor 3 (steering reaction force) and the torque acting on the clutch 5 from the road surface reaction force sensed by an axial force sensor (not shown) furnished on the hub of the front wheels 9 are estimated, and these are used to represent the degree of clutch engagement (analogous to an engagement torque sensing part). Then, when the degree of clutch engagement is at or greater than a prescribed value, found in advance by experiment or the like (5 Nm or greater, for example), it is determined that the clutch will not be disengaged. When the clutch 5 will not be disengaged, flow goes to step S52. When the clutch 5 will be disengaged, flow goes to step S55, a clutch release instruction is output, and flow advances to step S13 where steer-by-wire control is performed.

That is, even in a case in which the clutch 5 will become disengaged simply by outputting a clutch release instruction, when clutch release control is performed to disengage the clutch by driving the vehicle wheel turning motor 6, a lag occurs in the timing of the transition from EPS control to steer-by-wire control while the vehicle wheel turning motor 6 is being driven in a state wherein the clutch 5 has been disengaged. It is thus conceivable that clutch release timing and control switch timing will not match, so that clutch release control will not be performed. Here, however, in the fifth embodiment clutch release control is performed to drive the vehicle wheel turning motor 6 so that the turning angle will be smaller than the steering angle and to disengage the clutch 5, as described in the fourth embodiment, but it could also be replaced with control to hold the turning angle constant at δ f3 and disengage the clutch as described in any of the first through third embodiments.

At step S52 whether clutch release control can be executed is determined. Here, the possibility that the change in vehicle behavior or the change in steering reaction force generated by clutch release control will be large enough to disconcert the driver is estimated. Then, when it is possible that the change in vehicle behavior or the change in steering reaction force will disconcert the driver, clutch release control is determined to be non-executable. When changes are estimated to be small enough that the driver will not be disconcerted, clutch release control is determined to be executable.

In short, the current yaw jerk based on the yaw rate sensed by yaw rate sensor 13, for example, is calculated, and when the current yaw jerk exceeds a prescribed value (larger than 20°/s$^3$, for example), the change in vehicle behavior caused by driving the front wheels 9 to turn in conjunction with clutch release control will be large. It is estimated that the driver will likely think something is wrong so that clutch release control is determined to be non-executable. On the other hand, when current yaw jerk is at or less than a prescribed value (at or less than 20°/s$^3$, for example), the change in vehicle behavior accompanying clutch release control will be small. It is thus estimated that the driver is unlikely to think something is wrong, and clutch release control is determined to be executable.

Alternatively, when the steering reaction force sensed by the torque sensor 3 exceeds a prescribed value (greater than 3 Nm, for example), steering reaction force play will be large when there is a response delay in the reaction motor 4 when the reaction motor 4 is driven by steer-by-wire control. It is thus estimated to be likely that the driver will think something is wrong, and clutch release control is determined to be non-executable. On the other hand, when the steering reaction force sensed by the torque sensor 3 is at or less than a prescribed value (at or less than 3 Nm, for example), it is estimated that even if there is steering reaction force play, the likelihood of the driver feeling that something is wrong is low. As a result, clutch release control is determined to be executable. In this case, taking the response time of the reaction motor 4 into account, clutch release control could also be determined to be non-executable only if it is estimated that larger steering reaction force play will be generated.

Alternatively, since it is easy for the driver to feel steering reaction force play or a change in vehicle behavior when the driver is holding the wheel steady, and difficult to feel a change when steering, when it is sensed that steering is in progress the steering speed is calculated from the steering angle sensed by the steering angle sensor 2, for example. When steering speed θ sp is at or above 10°/s, steering is determined to be in progress, and clutch release control is considered executable. On the other hand, when steering speed θ sp is less than 10°/s, the steering wheel is determined to be held steady, and clutch release control is considered to be non-executable.

Here, it makes no difference whether clutch release control is to be performed if it is determined that none of the conditions, e.g., the aforementioned change in vehicle behavior or change in steering reaction force, will disconcert the driver, or if only a single condition is determined. These conditions can be selected and combined as appropriate.

When clutch release control is determined to be executable, flow goes to step S53, and when it is determined to be non-executable, flow goes to step S2.

At step S53 clutch release control is executed. The clutch release control at step S53 is the same as the control at step S11, step S41, step S42 and step S43 in FIG. 15 for the fourth embodiment, so a detailed explanation is omitted.

At step S54 whether the clutch 5 has been disengaged by clutch release control is determined. In short, when the clutch 5 is engaged the clutch 5 should be disengaged by performing clutch release control, but in the event of adhesion, such as when the inner and outer rings become engaged due to a factor other than engagement of the rollers 32, or of a defect in which current is not sent to the electromagnetic coil due to a broken wire or the like, the steering wheel 1 and the vehicle wheel turning mechanism 8 will not be able to be physically separated. The clutch 5 will not be released even when clutch release control is performed, so this determination is made. This determination can be made based on a state quantity, such as the turning angle, the steering angle or steering reaction force fluctuation due to clutch release control being performed. For example, it can be determined from the direction of change of steering reaction force relative to steering, or the direction of change of the steering angle and the turning angle. The steering reaction force can be sensed by the torque sensor 3, the steering angle by the steering angle sensor 2 and the turning angle by the turning angle sensor 7.

When the clutch 5 is disengaged, flow goes to step S13, and steer-by-wire control is performed. When the clutch has not disengaged, flow goes to step S2, and EPS control is continued.

In the fifth embodiment, for a transition to steer-by-wire control, whether the clutch 5 will be disengaged (released) simply by outputting a clutch release instruction is estimated from the steering situation or vehicle situation at step S51. When it is estimated that the clutch 5 will not be disengaged, flow advances to step S53, and clutch release control is performed.

That is, when the clutch engagement torque acting on the rollers 32 of the clutch 5 is small, the clutch 5 will be disengaged simply by outputting a release instruction to the clutch 5. For this reason, whether the clutch 5 will be disengaged is estimated from the steering situation and the vehicle situation, and clutch release control is performed only when the clutch 5 will not be disengaged. In this way, clutch release and the timing of switching control to steer-by-wire control can be reliably matched.

A determination as to whether the clutch 5 will be disengaged at this time is determined by comparing the degree of clutch engagement, estimated from the steering reaction force and road surface reaction force, to a predetermined prescribed value. That is, the torque applied in the direction of rotation of the clutch 5 that couples or separates the steering wheel 1 and the vehicle wheel turning mechanism 8 is the torque tending to rotate the steering wheel 1 via the steering wheel shaft 79 and the torque tending to rotate the pinion shaft 17. For this reason, whether the clutch 5 will be disengaged can be estimated without directly measuring the torque acting on the clutch 5 by using the steering reaction force and the road surface reaction force, which is input from the road surface, using sensors or the like.

In steer-by-wire transition control, whether clutch release control is executable is determined at step S52 according to the change in vehicle behavior or change in steering reaction force accompanying clutch release control (yaw jerk, degree of steering reaction force play and the like). When clutch release control is determined to be executable, flow advances to clutch release control at step S53, and a clutch release instruction is output.

In short, when clutch release control is executed the front wheels 9 will be turned. Whether the resulting change in vehicle behavior is large enough to disconcert the driver is estimated beforehand. By executing clutch release control when the change in vehicle behavior is estimated not to be large enough to disconcert the driver, it is possible to reliably release the clutch 5 while keeping the actual change in vehicle behavior to a degree that will not cause the driver to feel that something is wrong.

Also, at step S52, in place of the conditions according to changes in vehicle behavior described above, whether the steering reaction force play generated when clutch release control is executed will be large enough to disconcert the driver could be estimated. When the steering reactive force is estimated not to be large enough to do so, flow could advance to clutch release control at step S53.

That is, when the steering reaction force, as a response by means of which the driver easily senses changes in behavior, is at or below the prescribed quantity, for example 3 Nm, the change in steering reaction force produced by clutch release control can be minimized in order to execute clutch release control. Feelings of driver unease can be prevented.

Additionally at step S52, in place of the conditions according to changes in vehicle behavior described above, whether the driver is steering could be determined by whether or the steering speed θ sp is at or above 10°/s. When it is determined that steering is in progress, flow could advance to clutch release control at step S53.

That is, since the front wheels 9 will be moved with clutch release control, when clutch release control is executed with the steering wheel held steady, the driver will easily feel the fluctuations in vehicle behavior or steering reaction force. Thus, by performing clutch release control only when steering is in progress, feelings of driver unease can be prevented.

Clutch release control in step S53 is to be performed either when the change in vehicle behavior or the change in steering reaction force is small, or when the driver is steering, but this is not restrictive. Flow could advance to clutch release control in step S53 when a plurality of these conditions is satisfied.

With the steer-by-wire transition control in the fifth embodiment, when it is determined that the clutch 5 has not been released at step S54 flow advances to step S2. After a clutch engagement instruction is output, the system goes to EPS control.

That is, there are cases when clutch 5 is not released due to a fault such as adhesion, or the inability to supply current to the electromagnetic coil because of a broken wire or the like, rather than engagement between the inner and outer rings by the rollers 32 being the factor. In the fifth embodiment, it is possible to determine whether the clutch 5 has been released from a state quantity such as fluctuating steering torque, steering angle or turning angle caused by performing clutch release control, so in such a situation steering wheel pull can be controlled by shifting to EPS control rather than shifting to steer-by-wire control.

In the vehicle steering device of the fifth embodiment, a clutch release instruction is output only when it is estimated that clutch 5 will be disengaged in response to the clutch release instruction, so that the timing of clutch release and of switching to steer-by-wire can be matched reliably.

Also, in the vehicle steering device of the fifth embodiment, by estimating whether the clutch 5 will be disengaged using the steering reaction force and the road surface reaction force, it is possible to estimate whether the clutch 5 will be disengaged without directly measuring the torque acting on the clutch 5 by using a sensor or the like additionally furnished for the clutch 5.

Furthermore, in the vehicle steering device of the fifth embodiment, when yaw jerk or steering reaction force play, each of which is a quantity for estimation of changes in vehicle behavior accompanying clutch release control, is at or below a prescribed quantity that is permissible in not causing driver unease, or when it is determined that the driver is steering, clutch release control is executed. Therefore the clutch 5 can be released reliably without causing the driver to feel that something is wrong.

Additionally, in the vehicle steering device of the fifth embodiment, when it is determined that the clutch 5 has not been released after clutch release control, the system goes to EPS control. Thus, even when the reason that the clutch 5 has not released is not due to the engagement of the clutch 5 but to a defect in power supply to the electromagnetic coil or the like, steering wheel pull can be controlled.

Above, certain embodiments for implementing the invention have been explained, but it should be understood that the invention is not limited to these embodiments. For example, in the first through fifth embodiments, the two-way clutch shown in FIGS. 3 and 4 was used as the clutch that engages the rotating shaft of a vehicle wheel turning mechanism and the rotating shaft of the steering wheel by means of an engaging piece, but any clutch that engages the rotating shaft of a vehicle wheel turning mechanism and the rotating shaft of the steering wheel with an engaging piece can be used.

Also, when the clutch is engaged in the first through fifth embodiments, power steering control (EPS control) is performed that drives the vehicle wheel turning motor to add supplemental steering force to the steering force provided by the driver from the steering wheel. This is not limiting, however, and the vehicle wheel turning mechanism could be driven by only the driver's steering force when the clutch is engaged, for example.

In addition, in the fifth embodiment an example was shown wherein the amount of change in yaw jerk served as the amount of change in vehicle behavior. However, other values are satisfactory indicators of the amount of change in vehicle behavior, such as yaw rate, yaw moment, lateral acceleration, the amount of lateral movement, or any other measure of vehicle behavior that fluctuates according to changes in the turning angle.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A vehicle steering device, comprising:
   a steering wheel operable by a driver and having a steering wheel shaft connected thereto;
   a turning mechanism operable to turn at least one steered wheel to a turning angle in response to operation of the steering wheel;
   a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel;
   a steering control part configured to control the turning mechanism and selectively move the clutch between the engaged position and the disengaged position in response to the steering wheel, wherein on moving the clutch from the engaged position to the disengaged position, the steering control part is configured to perform clutch release control by providing a rotational angle of deviation between the steering wheel shaft and the turning mechanism in a direction of disengagement; and
   a vehicle wheel turning motor that imparts torque to the turning mechanism; and
   wherein the steering control part is configured to control the vehicle wheel turning motor to provide the rotational angle of deviation between the steering wheel shaft and the turning mechanism in the direction of disengagement during the clutch release control.

2. The vehicle steering device according to claim 1 wherein the steering control part is configured to perform the clutch release control by driving the turning mechanism so that a change in an angle of rotation of the first rotary member is small relative to a change in an angle of rotation of the second rotary member.

3. The vehicle steering device according to claim 2 wherein the steering control part, on moving the clutch from the engaged position to the disengaged position, is configured to perform the clutch release control by driving the turning mechanism so that the change in the angle of rotation of the first rotary member is kept small relative to the change in the angle of rotation of the second rotary member by keeping the angle of rotation of the first rotary member substantially constant during the clutch release control.

4. The vehicle steering device according to claim 1, further comprising:
   a steering sensing part operable to sense whether the driver is rotating the steering wheel; and wherein the steering control part is configured to determine whether to perform the clutch release control based on whether the driver is rotating the steering wheel.

5. The vehicle steering device according to claim 1, further comprising:
   a steering reaction motor operable to apply a steering reaction force to the steering wheel during steer by wire control; and wherein the steering control part, on moving the clutch from the engaged position to the disengaged position, is configured to impart the steering reaction force to the steering wheel and increase a torque applied to the turning mechanism by an amount of the steering reaction force prior to performing the clutch release control.

6. A vehicle steering device, comprising:
   a steering wheel operable by a driver and having a steering wheel shaft connected thereto;
   a turning mechanism operable to turn at least one steered wheel to a turning angle in response to operation of the steering wheel;
   a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel;
   a steering control part configured to control the turning mechanism and selectively move the clutch between the engaged position and the disengaged position in response to the steering wheel, wherein on moving the clutch from the engaged position to the disengaged position, the steering control part is configured to perform clutch release control by providing a rotational angle of deviation between the steering wheel shaft and the turning mechanism in a direction of disengagement; and an engagement torque sensing part that senses engagement torque of the clutch; and wherein the steering control part is configured to perform the clutch release control when the engagement torque of the clutch is at or above a prescribed value.

7. The vehicle steering device according to claim 6 wherein the engagement torque sensing part is configured to estimate the engagement torque of the clutch based on a steering reaction force and a road surface reaction force.

8. A vehicle steering device, comprising:

a steering wheel operable by a driver and having a steering wheel shaft connected thereto;

a turning mechanism operable to turn at least one steered wheel to a turning angle in response to operation of the steering wheel;

a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel;

a steering control part configured to control the turning mechanism and selectively move the clutch between the engaged position and the disengaged position in response to the steering wheel, wherein on moving the clutch from the engaged position to the disengaged position, the steering control part is configured to perform clutch release control by providing a rotational angle of deviation between the steering wheel shaft and the turning mechanism in a direction of disengagement; and a vehicle behavior change amount estimation part configured to estimate an amount of change of at least one vehicle behavior characteristic; and wherein the steering control part is configured to perform the clutch release control when the amount of change of the at least one vehicle behavior characteristic is at or below a prescribed value.

9. A vehicle steering device, comprising:

a steering wheel operable by a driver and having a steering wheel shaft connected thereto;

a turning mechanism operable to turn at least one steered wheel to a turning angle in response to operation of the steering wheel;

a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel;

a steering control part configured to control the turning mechanism and selectively move the clutch between the engaged position and the disengaged position in response to the steering wheel, wherein on moving the clutch from the engaged position to the disengaged position, the steering control part is configured to perform clutch release control by providing a rotational angle of deviation between the steering wheel shaft and the turning mechanism in a direction of disengagement;

a steering reaction motor operable to apply a steering reaction force to the steering wheel; and a steering reaction force change estimation part configured to estimate an amount of change of the steering reaction force during clutch release control; and wherein the steering control part is configured to perform the clutch release control when the amount of change of the steering reaction force is at or below a prescribed value.

10. A vehicle steering device, comprising:

a steering wheel operable by a driver and having a steering wheel shaft connected thereto;

a turning mechanism operable to turn at least one steered wheel to a turning angle in response to operation of the steering wheel;

a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel;

a steering control part configured to control the turning mechanism and selectively move the clutch between the engaged position and the disengaged position in response to the steering wheel, wherein on moving the clutch from the engaged position to the disengaged position, the steering control part is configured to perform clutch release control by providing a rotational angle of deviation between the steering wheel shaft and the turning mechanism in a direction of disengagement;

a turning angle sensing part operable to output a turning angle; and a steering angle sensing part operable to output a steering angle; and wherein the steering control part, on performing clutch release control, is configured to start steer-bywire control when a rotational angle of deviation between the steering angle and the turning angle is at or above a prescribed value.

11. A vehicle steering device, comprising:
a steering wheel operable by a driver and having a steering wheel shaft connected thereto;
a turning mechanism operable to turn at least one steered wheel to a turning angle in response to operation of the steering wheel;
a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel; and
a steering control part configured to control the turning mechanism and selectively move the clutch between the engaged position and the disengaged position in response to the steering wheel, wherein on moving the clutch from the engaged position to the disengaged position, the steering control part is configured to perform clutch release control by providing a rotational angle of deviation between the steering wheel shaft and the turning mechanism in a direction of disengagement; and wherein, on moving the clutch from the engaged position to the disengaged position, the steering control part is configured to perform the clutch release control when the steering wheel is moved toward a neutral position.

12. The vehicle steering device according to claim 11 wherein the steering control part, on moving the clutch from the engaged position to the disengaged position, is configured to maintain the clutch in the engaged position if the steering wheel is turned away from the neutral position.

13. A vehicle steering controller for a vehicle including a steering wheel operable by a driver and having a steering wheel shaft connected thereto, a turning mechanism operable to turn at least one steered wheel to a turning angle in response to operation of the steering wheel, and a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel, the vehicle steering controller comprising:
means for selectively moving the selectively engageable clutch between the engaged position and the disengaged position in response to operation of the steering wheel;
means for performing clutch release control by providing a rotational angle of deviation between the steering wheel shaft and the turning mechanism in a direction of disengagement when moving the clutch from the engaged position to the disengaged position; and
means for starting the clutch release control of moving the clutch from the engaged position to the disengaged position when the steering wheel is moved toward a neutral position from a turning position.

14. The vehicle steering controller according to claim 13, further comprising:
means for maintaining the clutch in the engaged position if the steering wheel is turned toward the turning position after starting the clutch release control and before the clutch is moved to the disengaged position.

15. A control method for a vehicle steering device including a steering wheel operable by a driver and having a steering wheel shaft connected thereto, a turning mechanism operable to turn at least one steered wheel to a turning angle in response to operation of the steering wheel, and a selectively engageable clutch positioned between the steering wheel and the turning mechanism and including a first rotary member mechanically connected to the turning mechanism, a second rotary member mechanically connected to the steering wheel shaft, and an engaging piece interposed between the first rotary member and the second rotary member, the clutch having an engaged position when the engaging piece is in wedging engagement between the first rotary member and the second rotary member wherein the steering wheel shaft is mechanically connected to the turning mechanism for turning the at least one steered wheel, and the clutch having a disengaged position when the engaging piece is in intermediate position between the first rotary member and the second rotary member wherein the steering wheel shaft is mechanically separated from the turning mechanism for steer-by-wire control of the at least one steered wheel, the method comprising:
selectively moving the clutch between the engaged position and the disengaged position in response to the steering wheel; and
performing clutch release control by providing a rotational angle of deviation between the steering wheel shaft and the turning mechanism in a direction of disengagement when moving the clutch from the engaged position to the disengaged position; wherein performing the clutch release control further comprises controlling a vehicle wheel turning motor to provide the rotational angle of deviation between the first rotary member and the second rotary member in the direction of disengagement.

16. The method according to claim 15 wherein performing the clutch release control further comprises:
driving the turning mechanism so that a change in an angle of rotation of the first rotary member is small relative to a change in an angle of rotation of the second rotary member.

17. The method according to claim 15 wherein performing the clutch release control further comprises:
driving the turning mechanism by keeping an angle of rotation of the first rotary member substantially constant during the clutch release control.

18. The method according to claim 15 wherein performing the clutch release control further comprises performing the clutch release control when an engagement torque of the clutch is at or above a prescribed value.

19. The method according to claim 18, further comprising:
estimating the engagement torque of the clutch based on a steering reaction force and a road surface reaction force.

20. The method according to claim 15 wherein controlling the vehicle wheel turning motor to provide the rotational angle of deviation between the first rotary member and the second rotary member in the direction of disengagement comprises controlling the turning mechanism using the vehicle wheel turning provide the rotational angle of deviation between the steering wheel shaft and the turning mechanism in the direction of disengagement during the clutch release control.

* * * * *